US011858734B1

(12) United States Patent
Wang et al.

(10) Patent No.: US 11,858,734 B1
(45) Date of Patent: Jan. 2, 2024

(54) TRASH CAN WITH LID ASSEMBLY

(71) Applicant: Nine Stars Group (U.S.A.) Inc., Ontario, CA (US)

(72) Inventors: Shi Ping Wang, Ontario, CA (US); Wenbin Ye, Fuzhou (CN); Jiangqun Chen, Fuzhou (CN)

( * ) Notice: Subject to any disclaimer, the term of this patent is extended or adjusted under 35 U.S.C. 154(b) by 0 days.

(21) Appl. No.: 18/105,827

(22) Filed: Feb. 4, 2023

(51) Int. Cl.
*B65F 1/08* (2006.01)
*B65F 1/16* (2006.01)
*B65F 1/06* (2006.01)

(52) U.S. Cl.
CPC ................ *B65F 1/163* (2013.01); *B65F 1/06* (2013.01)

(58) Field of Classification Search
CPC .... B65F 1/06; B65F 1/163; B65F 1/04; B65F 1/1623
USPC ........... 220/810, 908, 908.1, 495.06, 495.08, 220/495.11
See application file for complete search history.

(56) References Cited

U.S. PATENT DOCUMENTS

| | | | | |
|---|---|---|---|---|
| 3,261,545 | A | 7/1966 | Frazier | |
| 4,630,752 | A | 12/1986 | DeMars | |
| 4,765,579 | A | 8/1988 | Robbins | |
| 7,750,591 | B2 | 7/2010 | Wang | |
| 10,710,800 | B2 * | 7/2020 | Wegner | B65F 1/163 |
| 2002/0079315 | A1 | 6/2002 | Yang | |
| 2006/0027579 | A1 | 2/2006 | Yang | |
| 2006/0186121 | A1 | 8/2006 | Yang | |
| 2006/0283862 | A1 | 12/2006 | Yang et al. | |
| 2008/0000912 | A1 | 1/2008 | Lin | |
| 2008/0116207 | A1 | 5/2008 | Yang | |
| 2010/0147865 | A1 * | 6/2010 | Yang | B65F 1/04 220/810 |

* cited by examiner

*Primary Examiner* — John K Fristoe, Jr.
*Assistant Examiner* — Elizabeth J Volz
(74) *Attorney, Agent, or Firm* — David & Raymond Patent Firm; Raymond Y Chan

(57) ABSTRACT

A trash can includes a lid assembly including a lid and a retainer rim and a transition arrangement coupled with the lid assembly that enables the lid to be selectively transited between a normal state and a transition state. In the normal state, the lid is operable between an open state and a close state through a foot pedal. When the lid is pivotally lifted up to have an included angle larger than 90 degrees from the retainer rim, the lid is in the transition state that would not fall back toward the retainer rim and the retainer rim is able to be lifted up to rest on said lid for replacing trash bag until the retainer rim is moved back to site on an upper edge of a shell of the trash can.

13 Claims, 36 Drawing Sheets

TRASH CAN WITH LID ASSEMBLY

BACKGROUND OF THE PRESENT INVENTION

Field of Invention

The present invention relates to trash can and more particularly to a trash can with lid assembly that allows a trash bag to be placed in the can body and retains the open top edge of the trash bag by a bag holder of the lid assembly while a lid of the lid assembly is operable between an open state and a close state through a foot operation assembly.

Description of Related Arts

FIG. 1 illustrates a conventional trash can assembly published on Jun. 27, 2002, publication number US2002/0079315, which disclosed a trash can comprising an outer shell A22, an inner liner A24 for retaining a trash bag, a lid A32 to be operable by a pedal A40 of a foot operation device between an open state and a close state. In order to collect the trash, the user has to take out the inner liner A24 from the outer shell A22 for replacing the trash bag and then replace the inner liner A24 in the outer shell A22.

FIG. 2 illustrates a conventional foot operation assembly disclosed on Dec. 21, 2006, publication number US2006/0283862, comprising a link assembly B38 configured for operating the lid B32 of the trash can between an open state and a close state through a pedal B36, while a trim B46 is pivotally configured to be installed to the shell of the trash can.

FIG. 3 illustrates a trash can issued on Aug. 23, 1988, patent number U.S. Pat. No. 4,765,579, which does not have an inner shell and the trash bag C10 is retained to the opening edge of the trash container C4 by a rim assembly C2, but there is no lid and foot operation assembly being incorporated. FIG. 3B illustrated another trash can issued on Jul. 19, 1966, patent number U.S. Pat. No. 3,262,545, that also includes a rim D34 is pivotally installed to a lid D48 for retaining the opening portion of the trash bag to the upper edge D12 of the shell D14.

U.S. Pat. No. 7,750,591, discloses an induction actuation container that comprises a container cover that not only can retain the upper opening portion of a trash bag in the storage cavity of a container body but also is configured to operate a cover panel between an open state and a close state. However, the cover panel is operated through induction and no foot operation assembly is disclosed. FIG. 4 illustrates a trash can (garbage bin) published on Jan. 3, 2008, publication number US2008/0000912, which solves all the above shortcomings by providing a first ring E30 installed on a bin E20 and a second ring E40 pivotally installed on the first ring E30, wherein an upper edge E51 of a bag E50 placed in the bin E20 can be clamped between the first and second rings E30, E40. A foot operation assembly comprises a pedal E24 pivotally installed between a base E26 and a barrel E27 and configurated to operate a cover E60 pivotally mounted to the barrel E27 between an open state and a close state.

FIG. 5A and FIG. 5B illustrate a trash can assembly with bag trim, published on May 22, 2008 and Jun. 17, 2010, publication numbers US2008/0116207 and US2010/0147865 respectively, includes a shell F22 having an shell F22 having an enclosing wall that has an upper edge F24, a trim F28 pivotally connected to the upper edge F24, and a lid F30 pivotally connected to the upper edge F24, such that the trim F28 can be seated on the upper edge F24 and the lid F30 can be seated on the trim F28 when the lid F30 is closed. This configuration improves by pivotally connecting both the trim F28 and the lid F30 to the upper edge F24 of the shell F22 while both the trim F28 and the lid F30 can be operated to pivotally rotate upward to an open state and pivotally and rotate downward to a close state by means of a foot operation assembly such that the trim F28 seated on the upper edge F24 to retain the opening portion of a bag F26 over the upper edge F24 normally and the lid F30 to seat on the trim F28 to close the shell F22 independently. The foot operation assembly comprises a link assembly extending from a foot pedal F36 along a base F34 and then upwardly along the shell F22 to the lid F30, wherein the link assembly, which operates to translate an up-down pivot motion of the pedal F36 to an up-down pivot motion for the lid F30, includes a pedal bar F38 having a rear end that is pivotally coupled to the bottom end of a vertical link rod F40 such that the pedal bar F38 is pivotably coupled to the base F34 for pivoting movement about a pivot axis F42 and is connected at its front end to the foot pedal F36. A pedal bar F38 having a front end coupled with the pedal F36 and a rear end extended through the base F34 and pivotally connected to a bottom of the link rod F40 which is housed inside the base F34, so that the ring rod F40 is extended through the base F34 to the exterior of the shell F22 and then extends vertically along the rear of the shell F22 to the location of the lid F30 at the upper edge F24, so as to facilitate the bag F26 to be placed inside the shell F22 without being obstructed by the link rod F40. The foot operation assembly further comprises a hinge assembly, that pivotally couples the lid F30 and the trim F28 along the same pivot axis that is defined by a pivot shaft F50, including a hinge housing F52 provided at a rear of the trim F28 and a pair of pivot ears F58, F60 provided at the rear of the lid F30, for pivotally hinging the trim F28 and the lid F30 to the upper edge F24 of the shell F22.

FIG. 6A and FIG. 6B illustrate a trash can assembly with motion damper for lid which is an alternative configuration of the trash can as shown in FIG. 5A and FIG. 5B, published on Aug. 24, 2006, publication number US2006/0186121, wherein the trash can assembly has an outer shell G26, a foot pedal G48 pivotably coupled to the bottom end of the outer shell G26 along the front side of the outer shell G26, a lid G28 pivotably coupled to the top end of the outer shell G26, and a link assembly coupling the foot pedal G48 to the lid G28, wherein the link assembly includes a pedal bar G38 extending along a base G34 and a lifting rod G44 which is pivotally coupled with the foot pedal G48 via the pedal bar G38 and moving forwardly towards the front side of the outer shell G26 when the lid G28 is closed and a biasing member G68 is provided inside the outer shell G26 and applies an opposing force against the forward motion of the lifting rod G44 when the lid G28 is being closed. The link assembly and the foot pedal G48 are also configured to operate a supporting frame G32 to secured to a ledge G30 provided at a top edge of the rear wall of the outer shell G26 for retaining an upper portion of the bag placed in the outer shell G26.

Although both the foot operatable trash cans as illustrated in FIG. 5A to FIG. 6B provide a trim F28 or a supporting frame G32 which can be pivotally lifted and rotated upwards to allow the user to simply place a trash bag in the shell F22, G26 such that the opening portion of the trash bag can be folded outwardly and downward to cover an upper edge of the shell F22, G26. The trim F28 or the supporting frame G32 can be downwardly rotated to seat on the upper edge of the shell F22, G26, so as to press and retain the trash bag in position inside the shell F22, G26 that ensure the trash to be collected within the trash bag and prevent any trash from dropping within the shell F22, G26. Accordingly, the user may simply operate the lid F30, G28 to lift up to open the trash can by stepping down the foot pedal F36, G48 or to drop down to close the trash can by releasing the down pressing force applied to the foot pedal F36, G48. However, both the foot operatable trash cans as illustrated in FIG. 5A to FIG. 6B still have unsolved shortcomings as follows.

An additional device must be equipped to hold the trim F28 or supporting frame G32 in the uplifting state while placing the trash bag in the shell F22, G26.

The hinge housing F52 or the connector housing G60 for configuring the hinging mechanism are protruded to a rear side of the upper edge of the shell F22, G26 for pivotably coupling of the trim F28 or the supporting frame G32 and the lid F30, G28, as shown in FIG. 5B and FIG. 6B, which substantially renders a proper folding of the opening portion of the trash bag placed in the shell F22, G26 to the outside of the upper edge of the shell F22, G26 being difficult. The hinge housing F52 or the connector housing G50 forms an obstacle that prevents the opening portion of the trash bag from completely folding out and down, which weakens the mounting of the trash bag to the shell F22, G26 that may result the trash bag unsecured and fell back into the shell F22, G26 especially when heavy load of trash is collected in the trash bag Both the trash cans as illustrated in FIGS. 5A-5B and FIGS. 6A-6B are preferred to be used in offices for dry trash. If organic waste or kitchen waste such as vegetable, meat or fruit waste is disposed in the trach can, the lid F30, G28 are not configured to seal odor and smell generated from the decomposing organic waste, wherein since the lid F30, G28 is configured to have a cross sectional U-shape and the lid F30, G28 must make to have a larger diameter than that of the trim F28 or the supporting frame G32 to facilitate the uplifting movement and downward moving thereof, a gap or clearance is formed between the lid F30, G28 and the trim F28 or the supporting frame G32 for ease of opening and closing of the lid F30, G28 with respect to the trim F28 or the supporting frame G32.

SUMMARY OF THE PRESENT INVENTION

The invention is advantageous in that it provides a trash can with lid assembly, wherein the hinge mechanism pivotally mounting the lid and the retainer rim to the shell would not form any obstacle to the mounting of the trash bag, wherein an opening portion of a trash bag placed in the shell of trash is capable of folding out and downward to encircle around an outer surface of the upper edge of the shell so as to ensure a secure mounting of the trash bag to the shell of the trash can by means of the retainer rim.

Another advantage of the invention is to provide a trash can with lid assembly, wherein the lid is configured to be set to a normal foot operating state or an open retaining state, wherein during the open retaining state, the lid is moved to an back-inclining position and the retainer rim can be pivotally uplifted from the retainer state to the uplifting sate to rest against the lid in the back-inclining position simply due to gravity.

Another advantage of the invention is to provide a trash can with lid assembly, wherein no additional device is required to hold the retainer rim in uplifting state while placing the trash bag in the shell.

Another advantage of the invention is to provide a trash can with lid assembly, wherein a sealing arrangement is provided between the lid and the retainer rim of the lid assembly so as to prevent odor inside the trash can from leaking.

Additional advantages and features of the invention will become apparent from the description which follows, and may be realized by means of the instrumentalities and combinations particular point out in the appended claims.

According to the present invention, the foregoing and other objects and advantages are attained by a trash can with lid assembly for mounting a trash bag therein, comprising:

a tubular shell having an upper end defining a top opening, a lower end and a receiving cavity defined between the upper end and the lower end for receiving the trash bag therein;

a base mounted to the lower end of the shell;

a foot pedal pivotally coupled at a side of the base;

a lid assembly, comprising:

a retainer rim, having a rim opening, pivotally coupled to the shell in such a manner that the retainer rim is able to be selectively moved to site on an upper edge of the shell while the rim opening is communicating with the receiving cavity through the top opening of the shell or pivotally lifting up away from the upper edge of the shell, and a lid pivotally mounted to the shell and configured to selectively move between an open state and a close state, wherein in the close state, the lid sits on the retainer rim and covers the rim opening of the retainer rim and the top opening of the shell;

a link assembly coupling the foot pedal to the lid in such a manner that the lid is able to be lifted up pivotally from the retainer rim to the open state in response to a pressing force applied to the foot pedal, wherein in the open state, the lid is pivotally lifted up to have an included angle of 90 degrees or less from the retainer rim sited on the upper edge of the shell, and the lid falls back to the close state when the pressing force applied to the foot pedal is released; and a transition arrangement coupled with the lid of the lid assembly that enables the lid to be selectively transited between a normal state and a transition state, wherein in the normal state, the lid is operatable between the open state and the close state through the foot pedal, wherein when the lid is pivotally lifted up to have the included angle larger than 90 degrees, the lid is in the transition state and would not fall back toward the retainer rim, such that the receiving cavity is remained opened through the top opening of the shell and the rim opening of the retainer rim, and that the retainer rim is able to be pivotally lifted up to rest against the lid for replacing the trash bag in the shell and inverting an opening portion of the trash bag over the upper edge of the shell until the retainer rim is moved back to site on the upper edge of the shell to sandwich the opening portion of the trash bag between the upper edge of the shell and the retainer rim.

In one embodiment, a retaining gap is formed between a hinge assembly of the link assembly and the upper edge of the shell for a respective portion of an opening portion of the trash bag to be folded and retained therein.

In one embodiment, the retainer rim has a circular sealing slot indented in a top ring surface of the retainer rim and extended around the rim opening and the lid has a circular ridge protruded on a bottom surface of the lid and sized and shaped to engage with the sealing slot so as to provide a sealing arrangement for the lid assembly.

Still further objects and advantages will become apparent from a consideration of the ensuing description and drawings.

These and other objectives, features, and advantages of the present invention will become apparent from the following detailed description, the accompanying drawings, and the appended claims.

Figure 1:
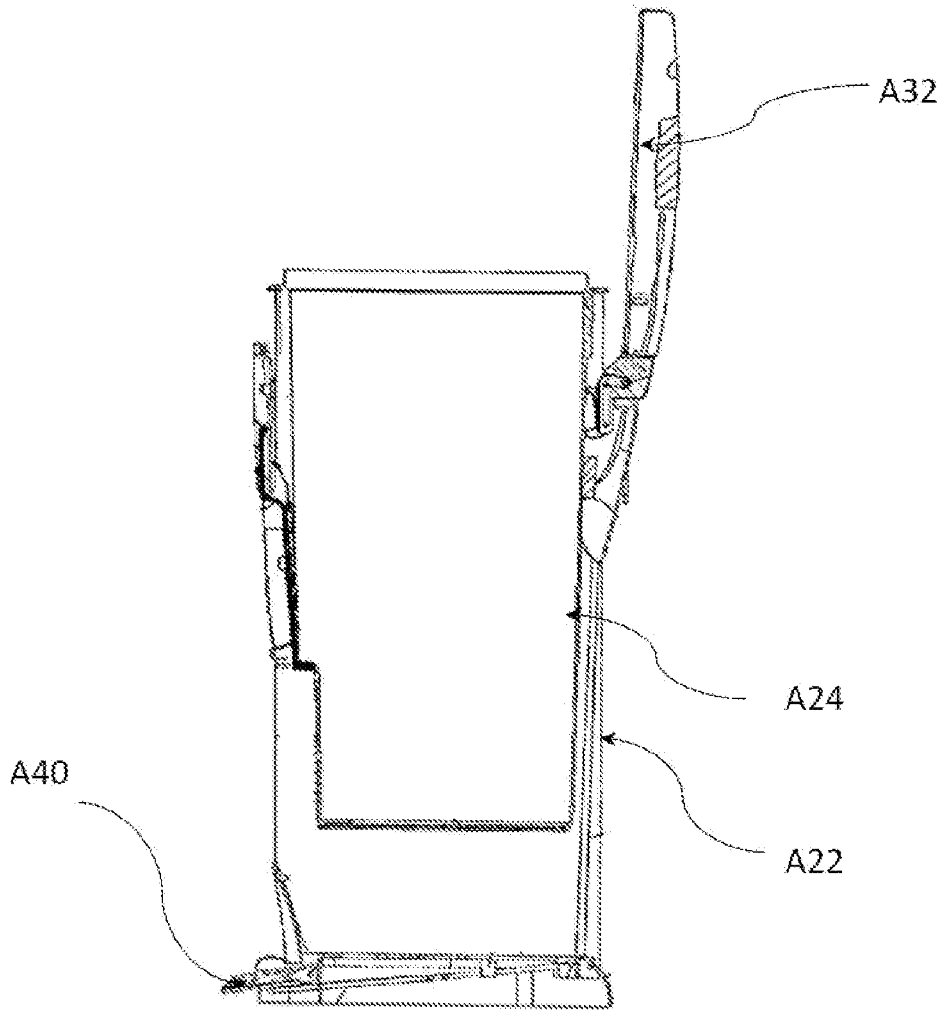
FIG. 1 PRIOR ART
FIG. 1 is a sectional view of a first conventional trash can.
Figure 2:
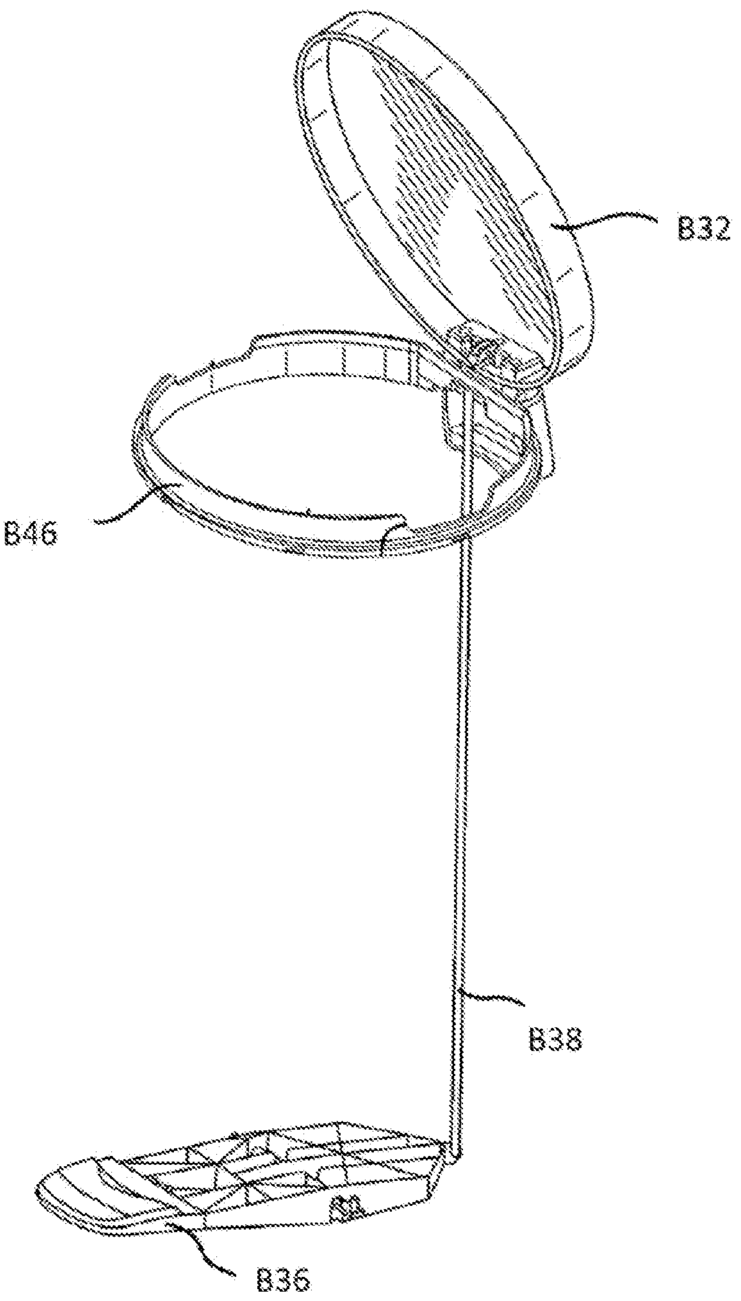
FIG. 2 PRIOR ART
FIG. 2 is a perspective view of a conventional foot operation assembly.
Figure 3A:
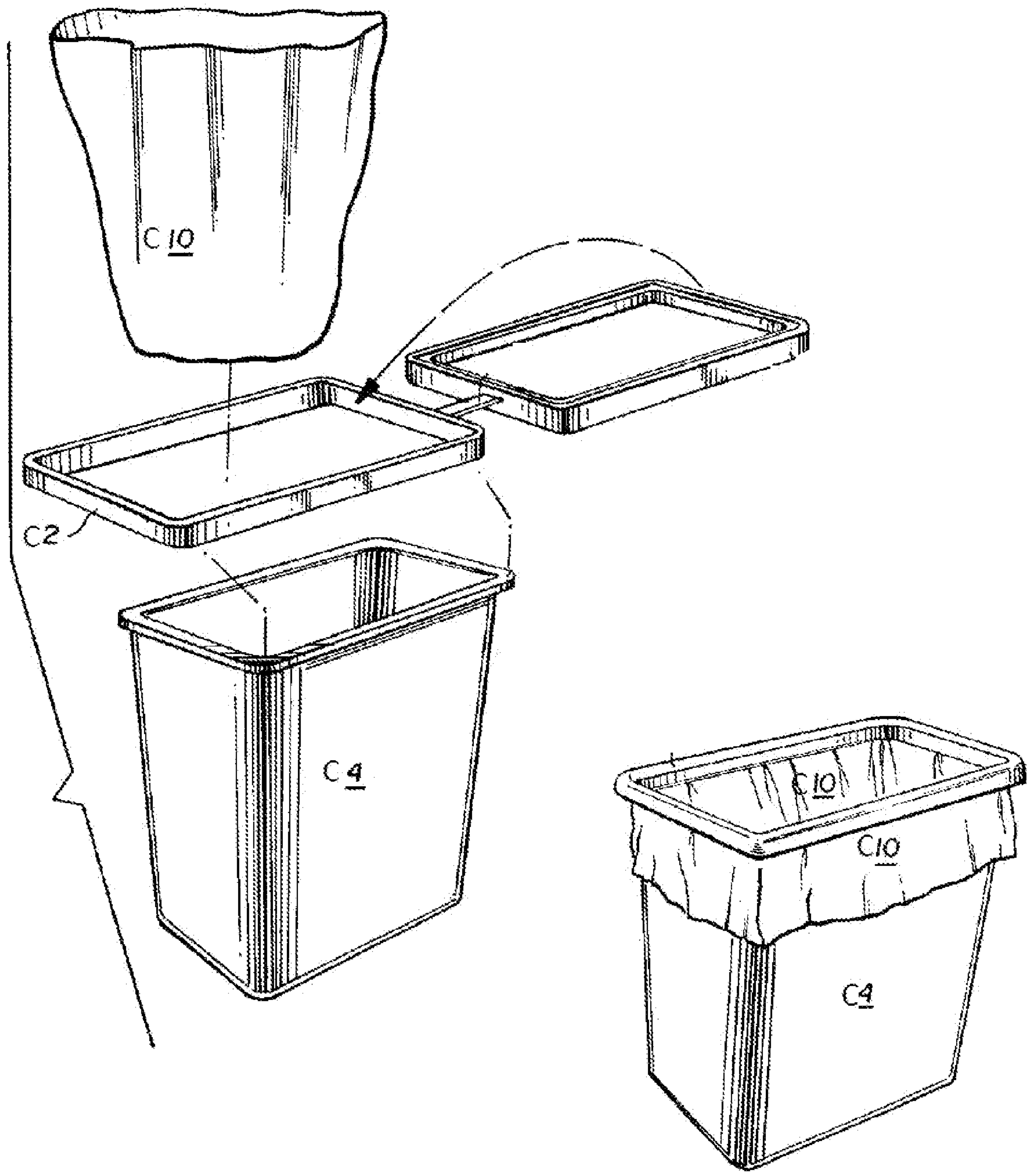
FIG. 3A PRIOR ART
FIG. 3A includes an exploded view and a perspective view of a second conventional trash can.
Figure 3B:
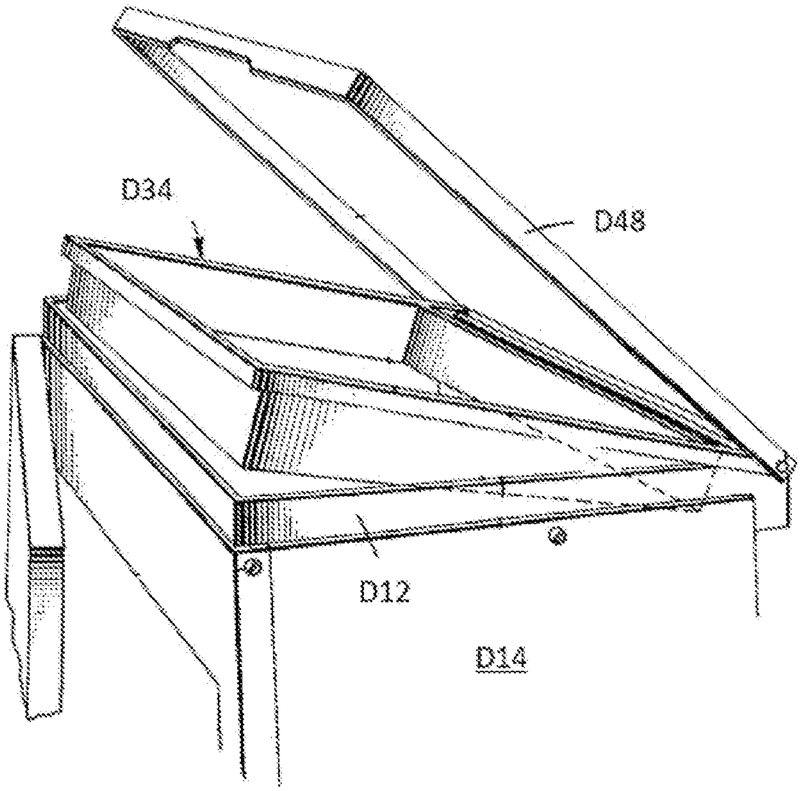
FIG. 3B PRIOR ART
FIG. 3B is a partial perspective view of a third conventional trash can.
Figure 4:
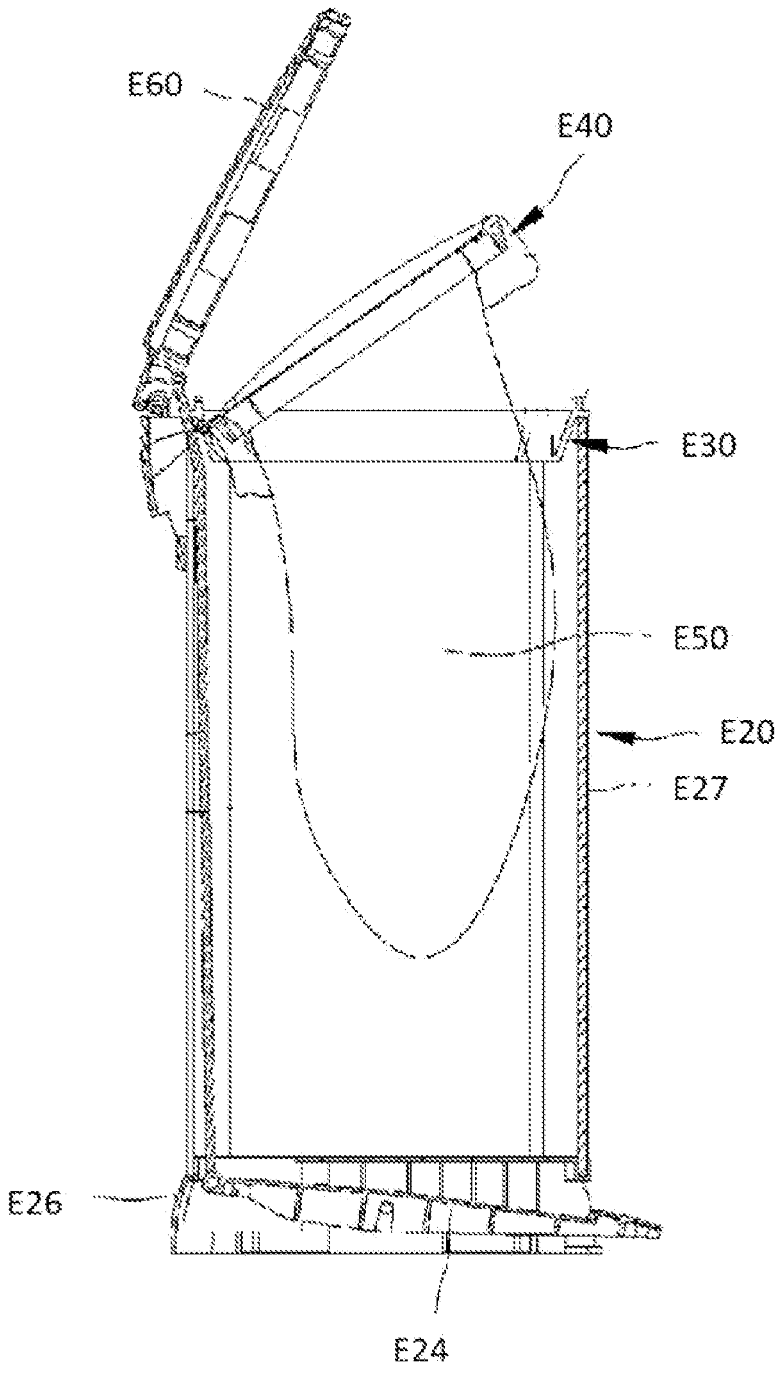
FIG. 4 PRIOR ART
FIG. 4 is a sectional view of a fourth conventional trach can.
Figure 5A:
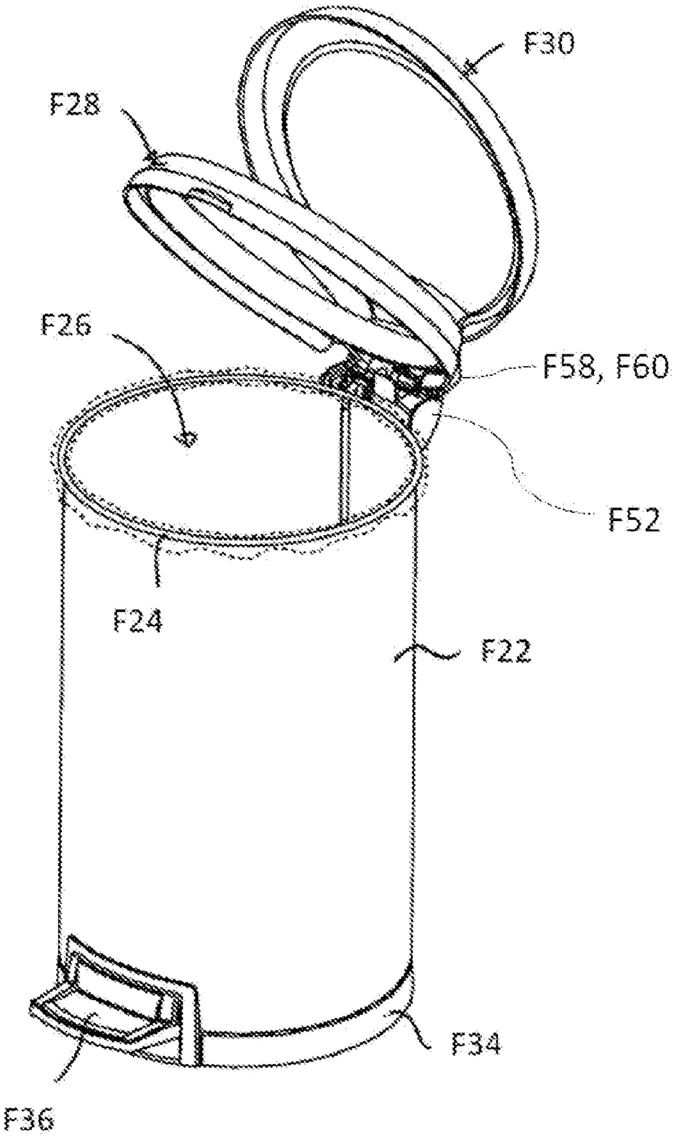
FIG. 5A PRIOR ART
FIG. 5A is a perspective view of a fifth conventional trash can.
Figure 5B:
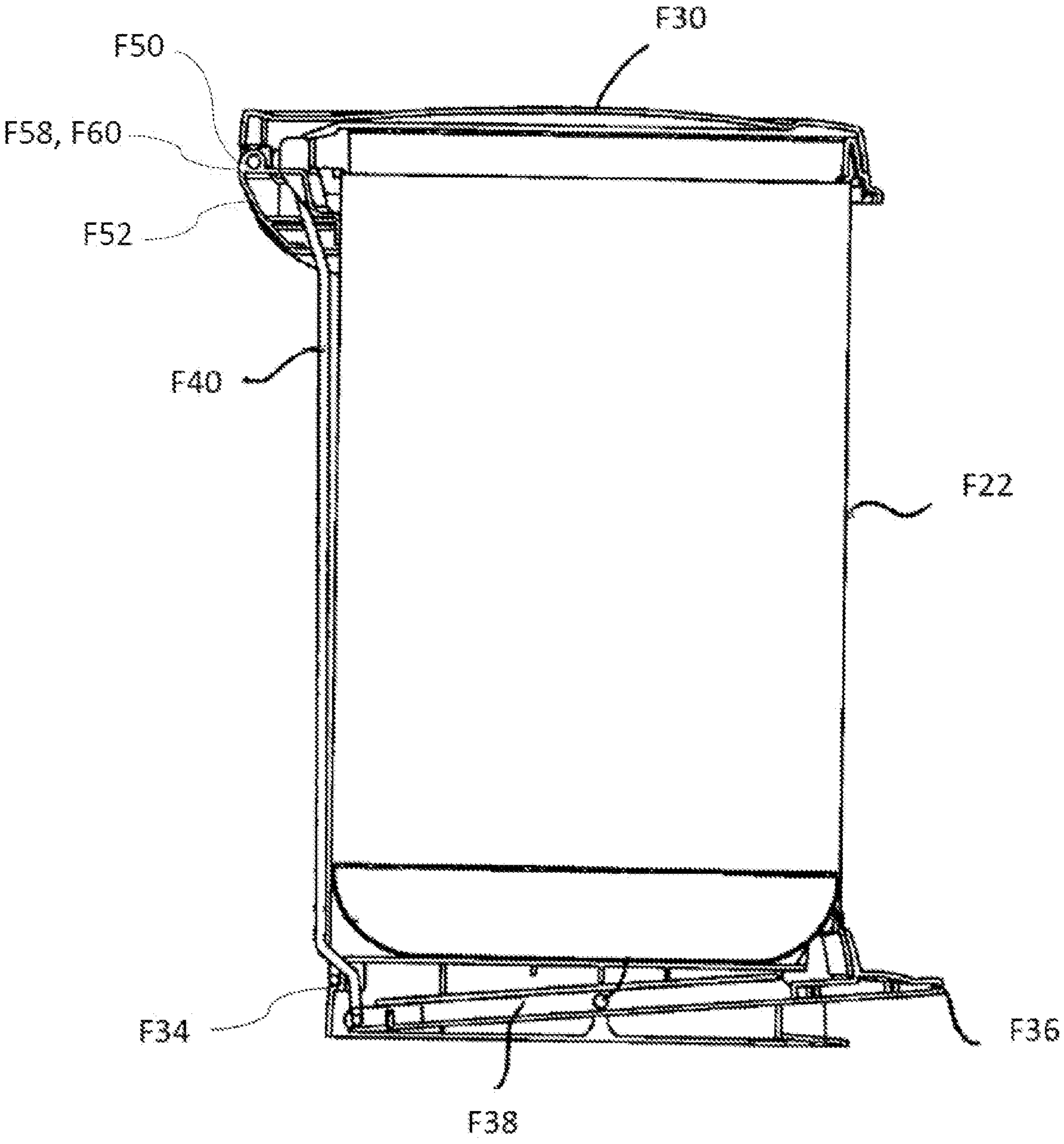
FIG. 5B PRIOR ART
FIG. 5B is a sectional view of the fifth conventional trash can.
Figure 6A:
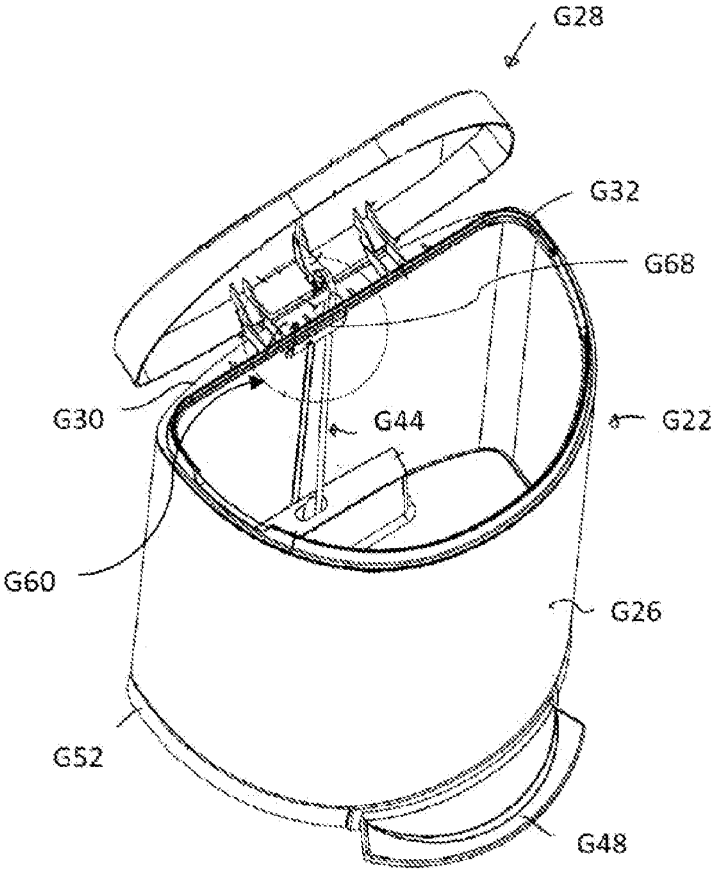
FIG. 6A PRIOR ART
FIG. 6A is a perspective view of a sixth conventional trash can.
Figure 6B:
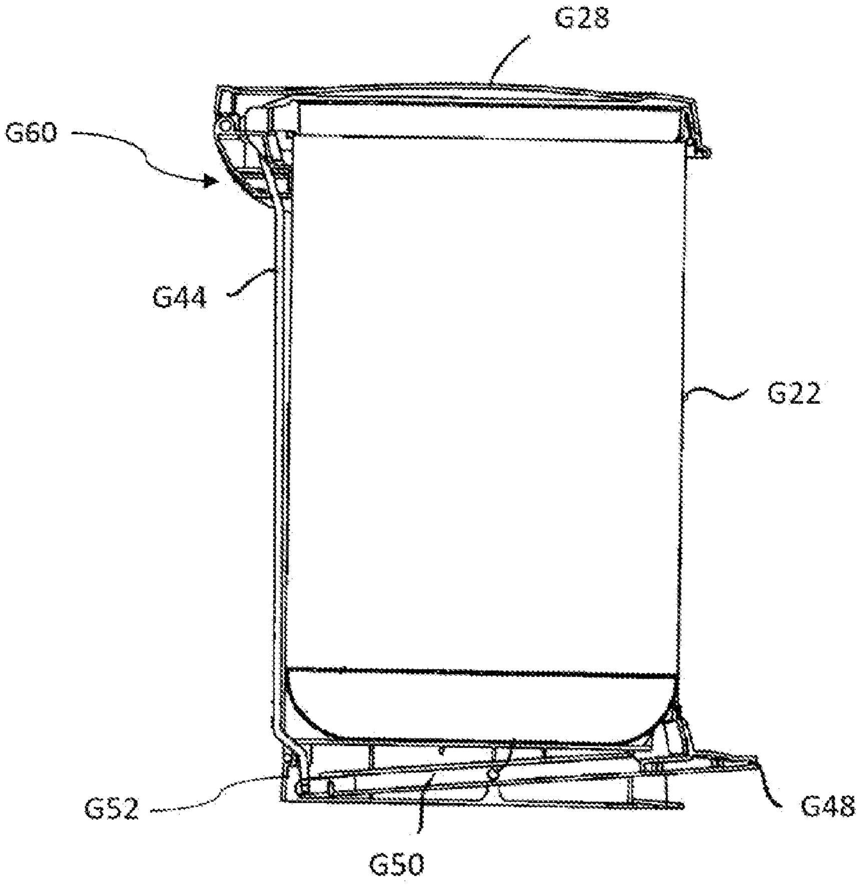
FIG. 6B PRIOR ART
FIG. 6B is a sectional view of the sixth conventional trash can.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Further, this description is not to be considered as limiting the scope of the embodiments described herein in any way, but rather as merely describing implementation of the one or more embodiments described herein.

FIGS. 7-21 illustrate a trash can with lid assembly according to a preferred embodiment of the present invention, which comprises a tubular shell 10, a base 20, a foot pedal 30, a lid assembly, 40, a link assembly 50, a transition arrangement 60, and a sealing arrangement 70.

Referring to FIGS. 8-10 and 18-19, the shell 10, which is made of durable material such as metal or plastic, has an upper end 11 defining a top opening 110, a lower end 12 and a receiving cavity 13 defined between the upper end 11 and the lower end 12 for receiving a trash bag 80 therein. The base 20 is mounted to the lower end 12 of the shell 10. The shell 10 can have any desired shape, including oval, triangular, rectangular, square or circular. The upper end 11 of the shell 10 forms an annular lip to provide a circular upper edge 111 and define the top opening 110.

Figure 12:
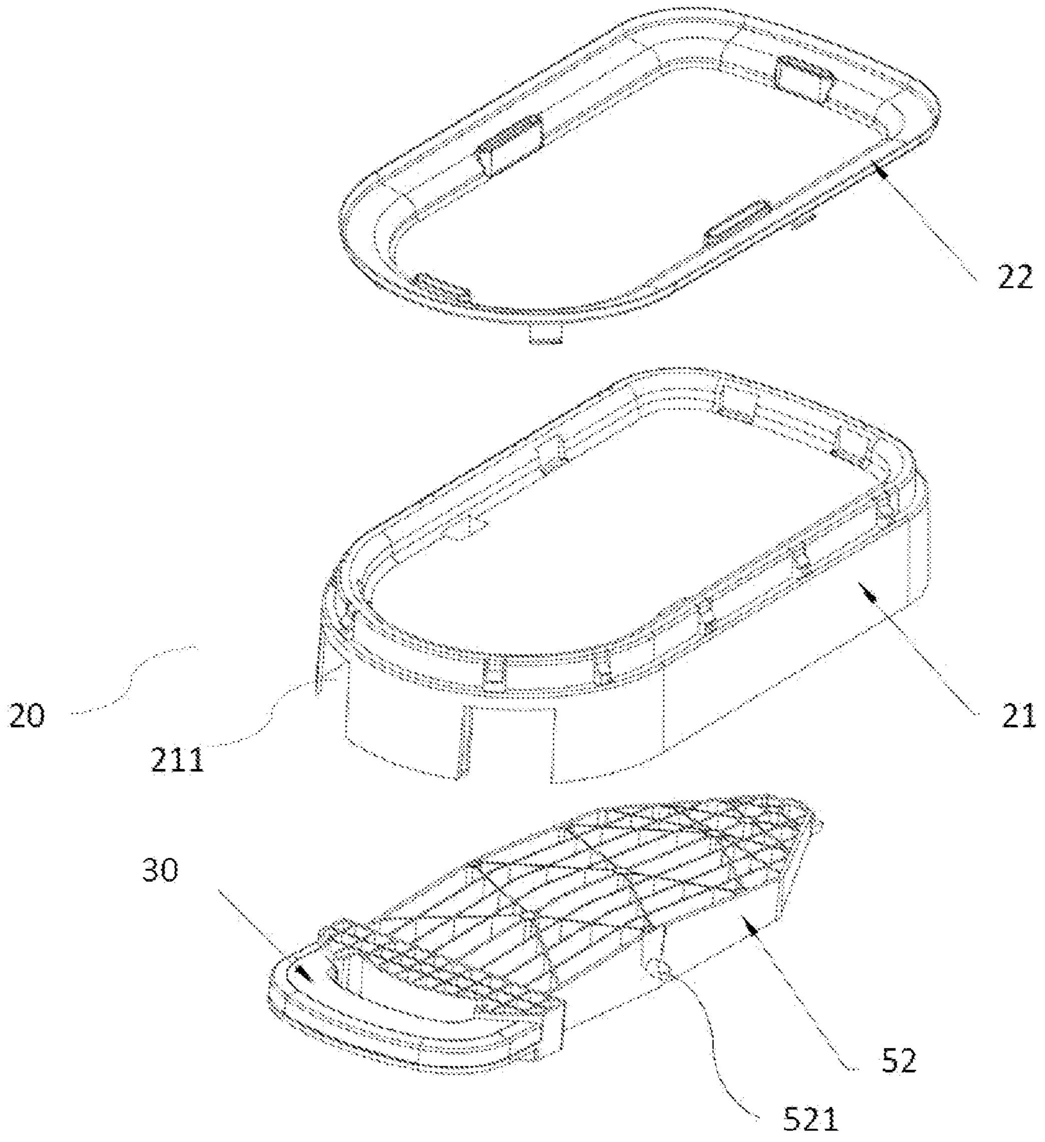
FIG. 12 is an exploded view of the base of the trash can with lid assembly according to the above preferred embodiment of the present invention.
Figure 13:
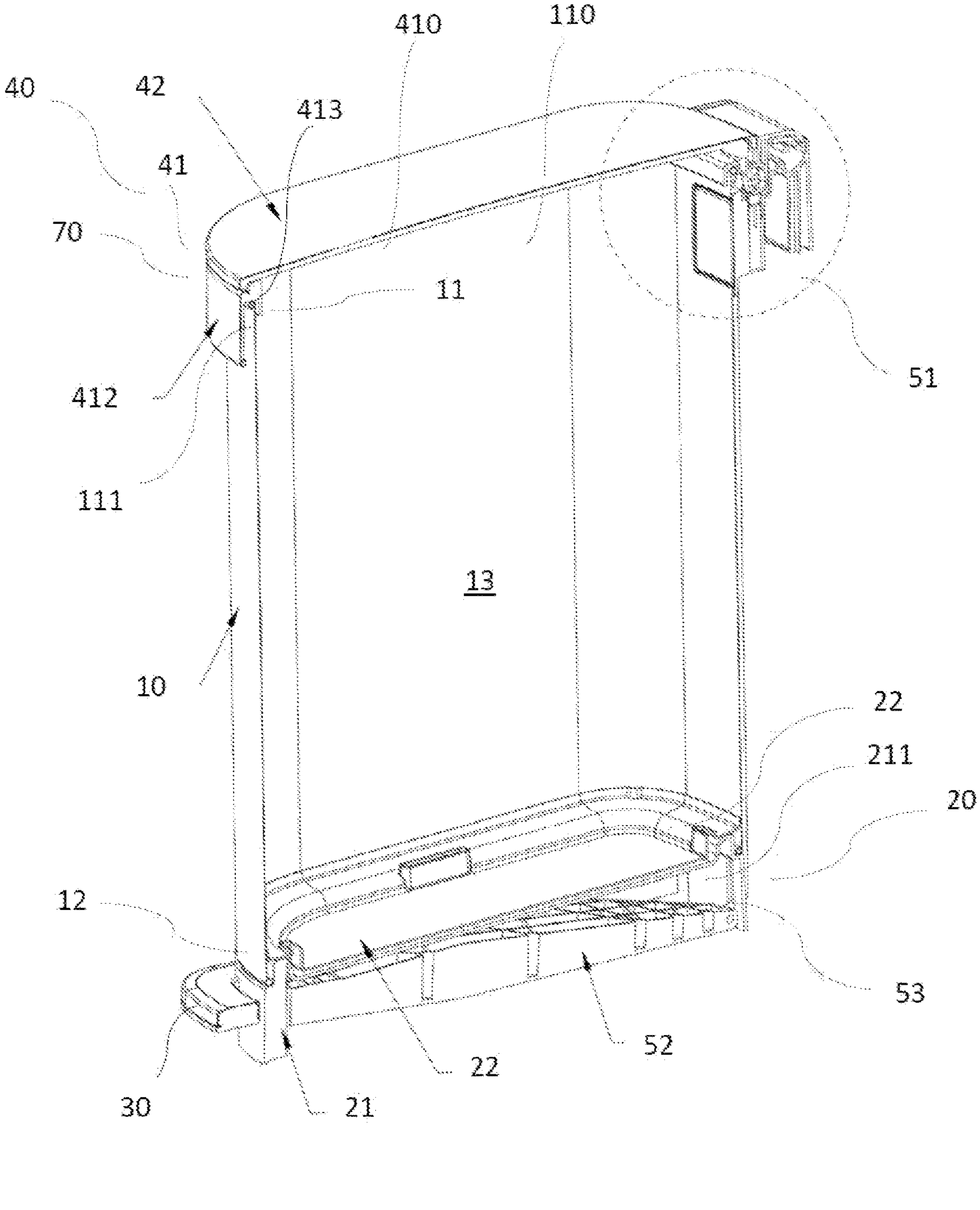
FIG. 13 is sectional perspective view of the trash can with lid assembly in close state according to the above preferred embodiment of the present invention.
Figure 16:
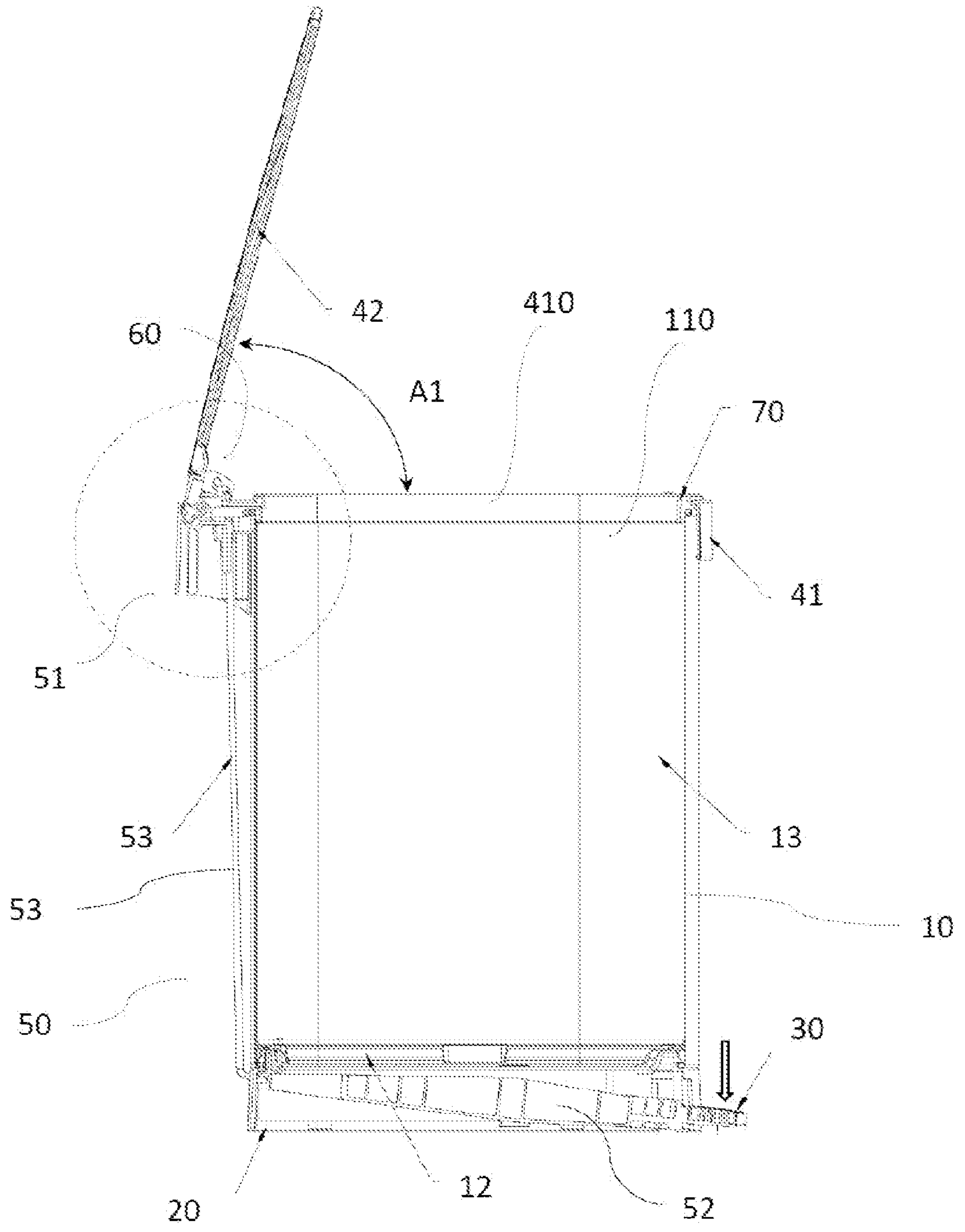
FIG. 16 is a sectional view of the trash can with lid assembly in open state according to the above preferred embodiment of the present invention.

Referring to FIGS. 12, 13 and 16, the base 20 is mounted to the lower end 12 of the shell 10. The base 20 comprises a bottom base 21 and a curved skirt 22 mounted on the bottom base 21. The lower end 12 of the shell 10 is securely mounted on the bottom base 21 to form an integral body and the skirt 22 which can be formed in one plastic piece is positioned in the receiving cavity 13 and mounted on the bottom base 21 to function as a bottom of the receiving cavity 13. According to the preferred embodiment, the bottom base 21 has a U-shaped cross section defining a bottom chamber 211 therein.

Figure 18:
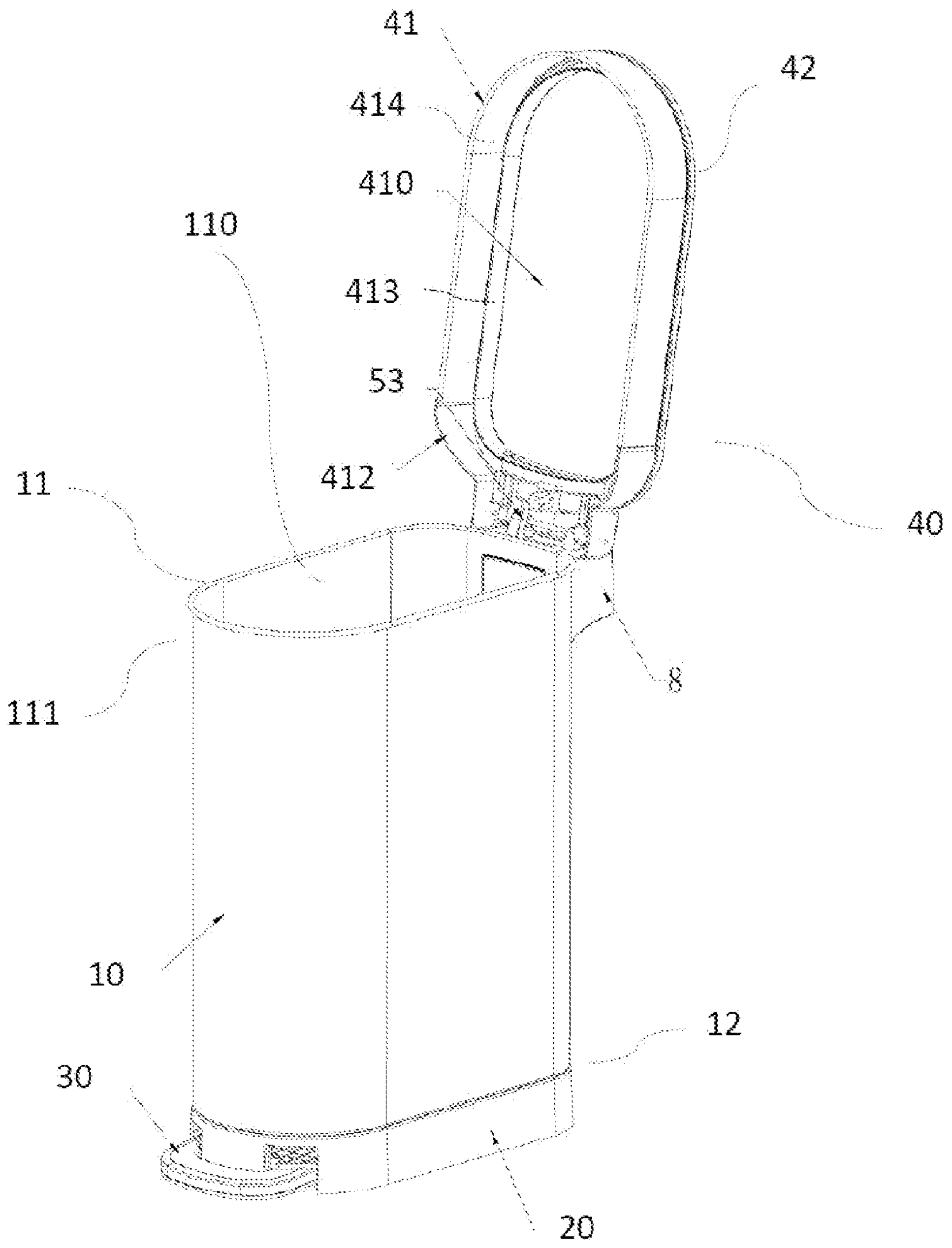
FIG. 18 is a perspective view of the trash can with lid assembly in transition state according to the above preferred embodiment of the present invention.

The foot pedal 30 is pivotally coupled at a side of the base 20. The link assembly 50. The lid assembly 40 comprises a retainer rim 41 and a lid 42, wherein the retainer rim has a rim opening 410 and is pivotally coupled to the shell 10 such that the retainer rim 41 is able to be selectively resting on the upper edge 111 of the shell 10 while the rim opening 410 is communicating with the receiving cavity 13 through the top opening 110 of the shell 10 (as shown in FIGS. 7-10, 13, and 16) or pivotally lifting up away from the upper edge 111 of the shell (as shown in FIGS. 18-20).

The lid 42 is pivotally mounted to the shell 10 and configured to selectively move between an open state and a close state, wherein in the close state, as shown in FIGS. 7, 9-10 and 13, the lid 42 sits on the retainer rim 41 and covers the rim opening 410 of the retainer rim 42 and the top opening 110 of the shell 10.

Referring to FIGS. 9, 16 and 18-20, the link assembly 50 is arranged to couple the foot pedal 30 to lid 42 in such a manner that the lid 42 is able to be lifted up pivotally from the retainer rim 42 to the open state in response to a pressing force applied to the foot pedal 30, as shown in FIG. 16. In the open state, the lid 42 is pivotally lifted up to have a first included angle A1 of 90 degrees or less from the retainer rim sited on the upper edge 111 of the shell 10, and the lid 42 falls back to the close state when the pressing force applied to the foot pedal 30 is released.

The transition arrangement 60 is coupled with the lid 42 of the lid assembly 40 that enables the lid 42 to be selectively transited between a normal state, as shown in FIGS. 7-10, 13-14 and 16-17, and a transition state, as shown in FIGS. 18-21. In the normal state, the lid 42 is operatable between the open state and the close state through the foot pedal 30.

Figure 19A:
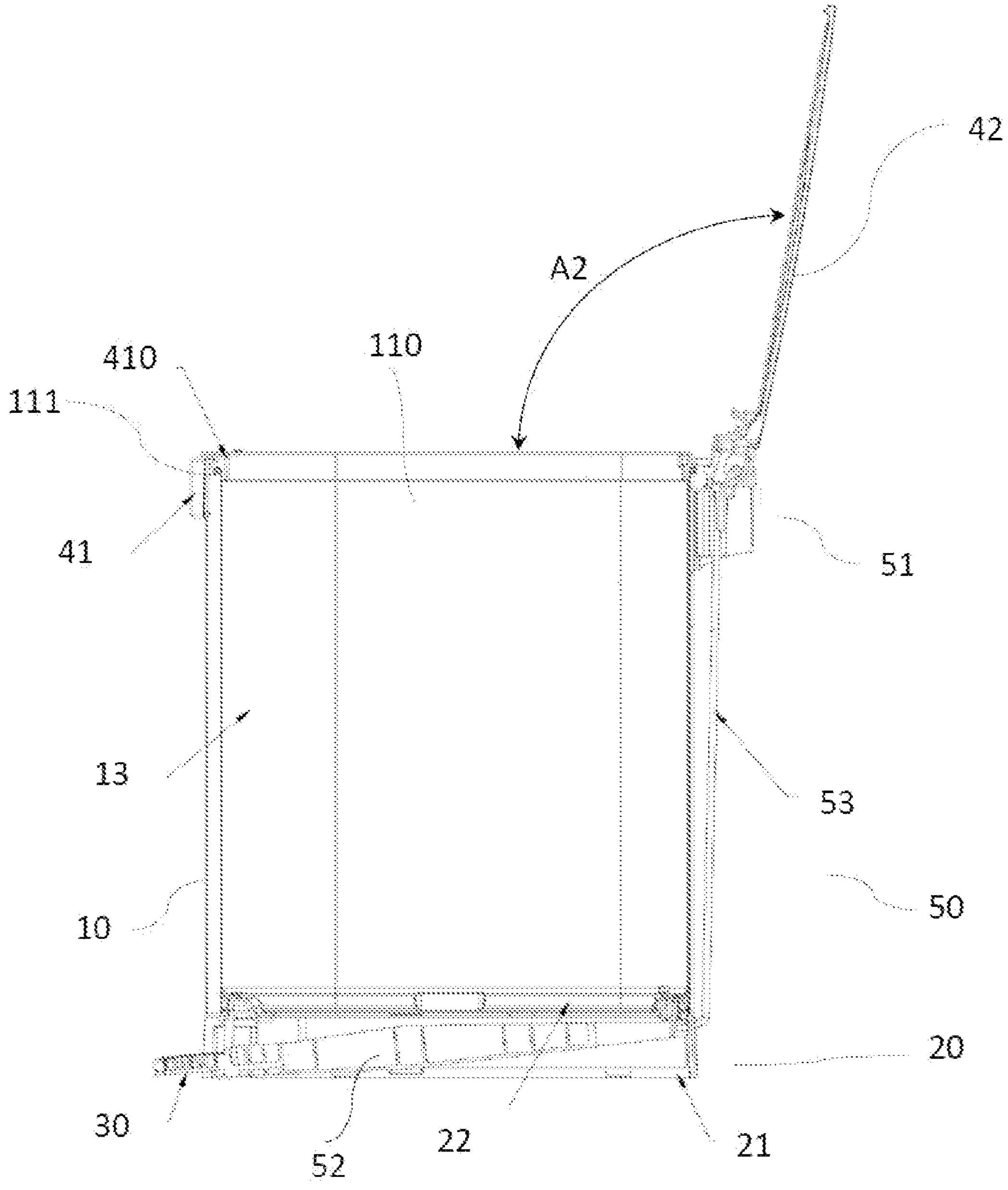
FIG. 19A is a sectional view of the trash can with lid assembly in transition state according to the above preferred embodiment of the present invention, wherein the lid is uplifted to have an included angle larger than 90 degrees.
Figure 19B:
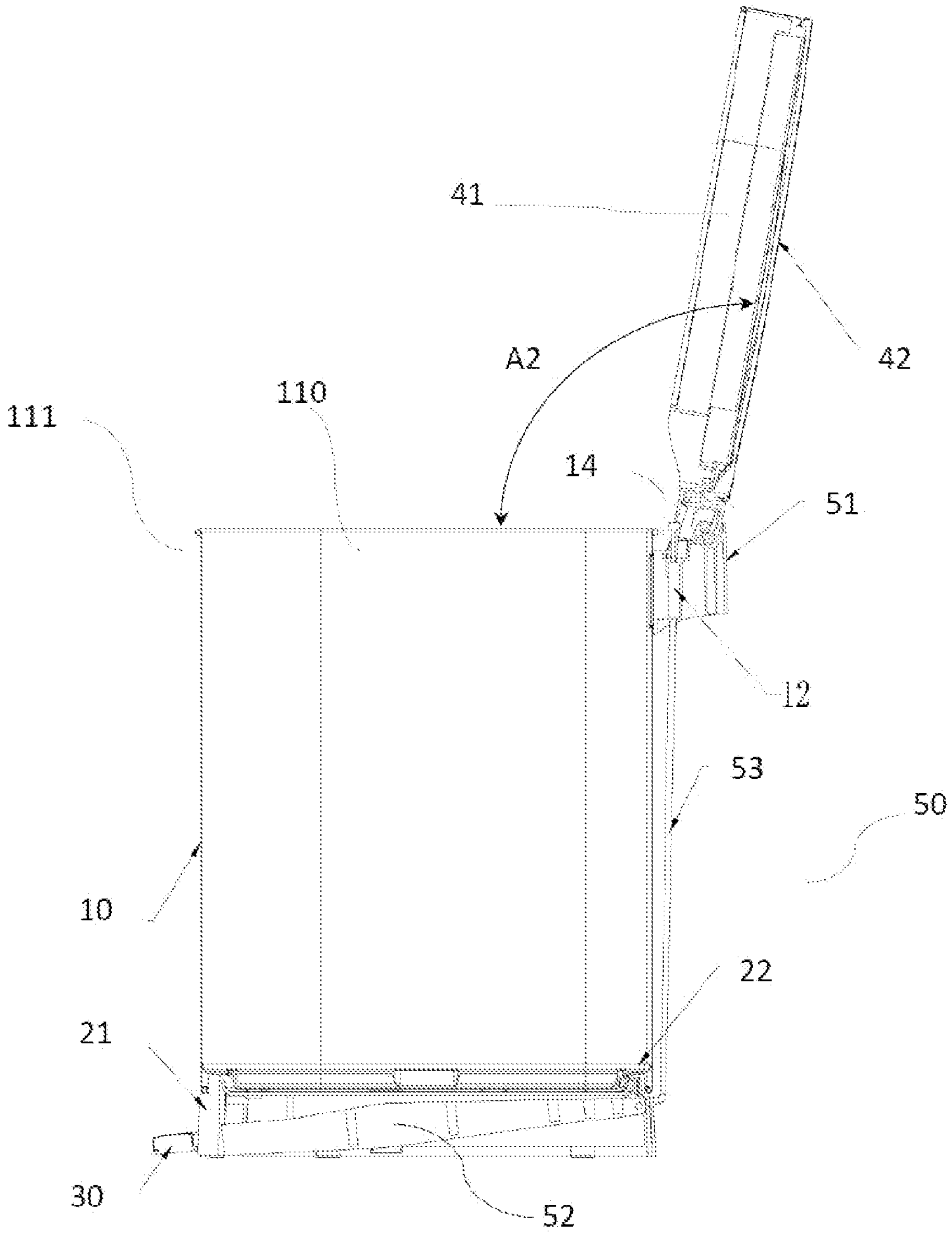
FIG. 19B is a sectional view of the trash can with lid assembly in transition state according to the above preferred embodiment of the present invention, wherein both the lid and the retainer rim are uplifted to have an included angle larger than 90 degrees.
Figure 20:
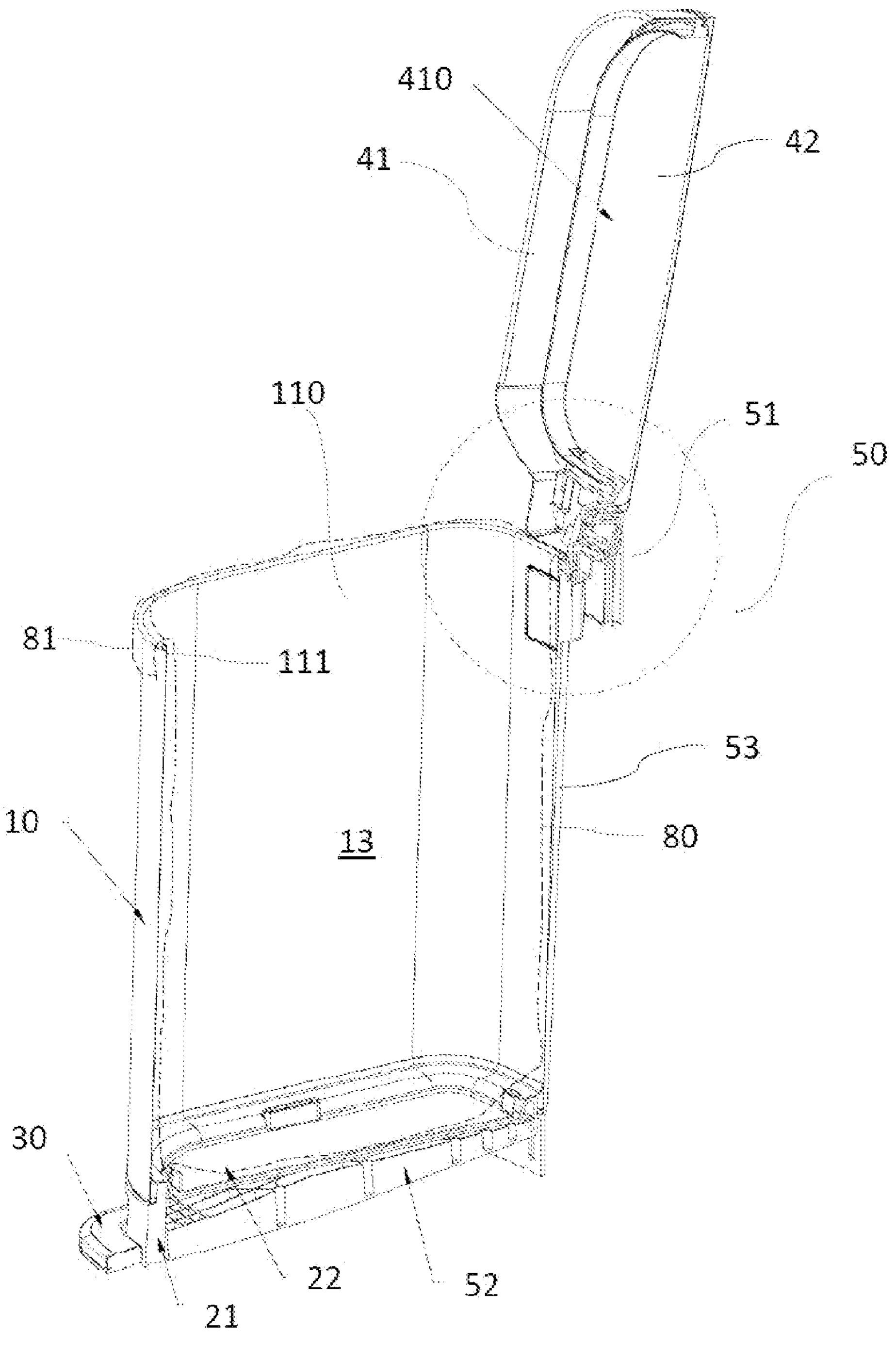
FIG. 20 is a sectional perspective view of the trash can with lid assembly in transition state according to the above preferred embodiment of the present invention.

When the lid 42 is pivotally lifted up to have a second included angle A2 larger than 90 degrees, the lid 42 is in the transition state and would not fall back toward the retainer rim 41 such that the receiving cavity 13 is remained opened through the top opening 110 of the shell 10 and the rim opening 410 of the retainer rim 41, as shown in FIG. 19A, to facilitate the user to dispose trash continuously. Also, during this transition state, the retainer rim 41 is able to be pivotally lifted up to the second included angle to rest against the lid 42, as shown in FIG. 19B, for replacing the trach bag 80 in the receiving cavity 13 of the shell 10 and inverting up the opening portion 81 over the upper edge 111 of the shell 10 until the retainer rim 41 is moved back to site on the upper edge 111 of the shell 10 to sandwich the opening portion 81 of the trash bag 80 between the upper edge 111 of the shell 10 and the retainer rim 41. It is appreciated that when the lid 42 and the retainer rim 41 are pivotally rotated rearwards to lift up for more than 90 degrees as shown in FIGS. 19A and 19B, the center of gravity of the lid 42 or the retainer rim 41 is beyond a rear side of the shell 10 so that the rid 42 and the retainer rim 41 will remain in the lifted up position unless an external force is applied to rotate frontward to move back the retainer rim 41 to its normal siting position.

Figure 10:
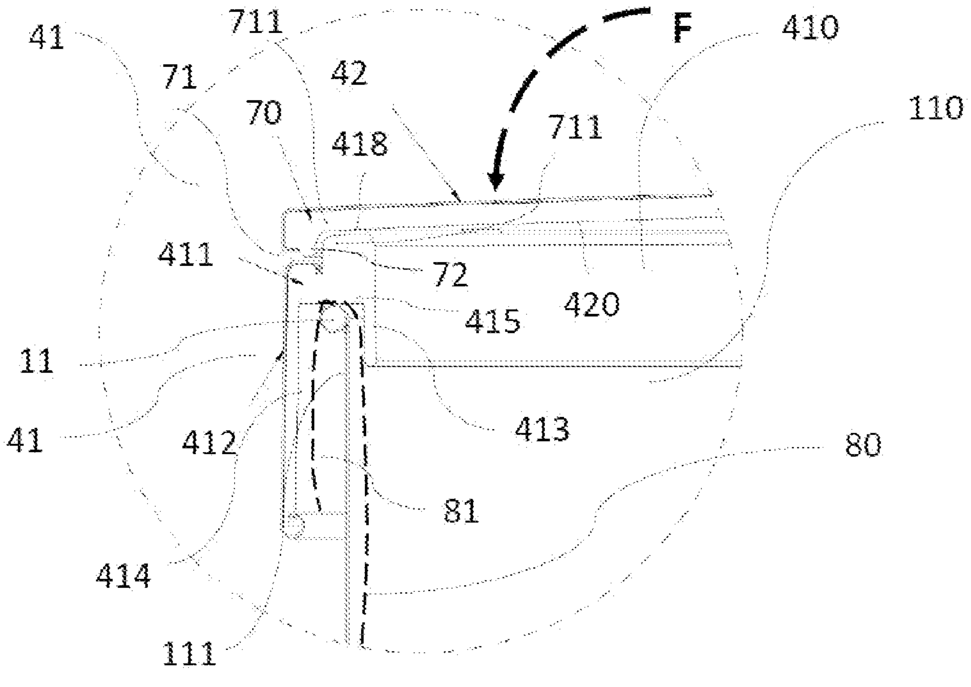
FIG. 10 is an enlarged view of the sealing arrangement of the trash can with lid assembly in close state according to the above preferred embodiment of the present invention.
Figure 11:
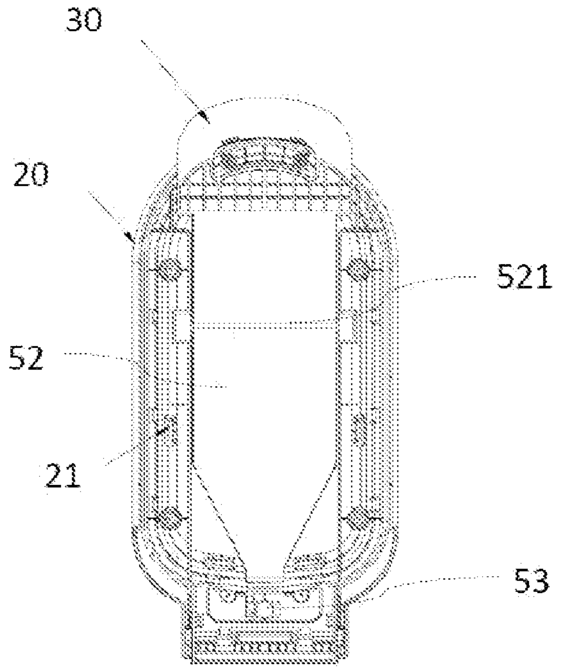
FIG. 11 is a bottom view of the trash can with lid assembly according to the above preferred embodiment of the present invention.
Figure 14:
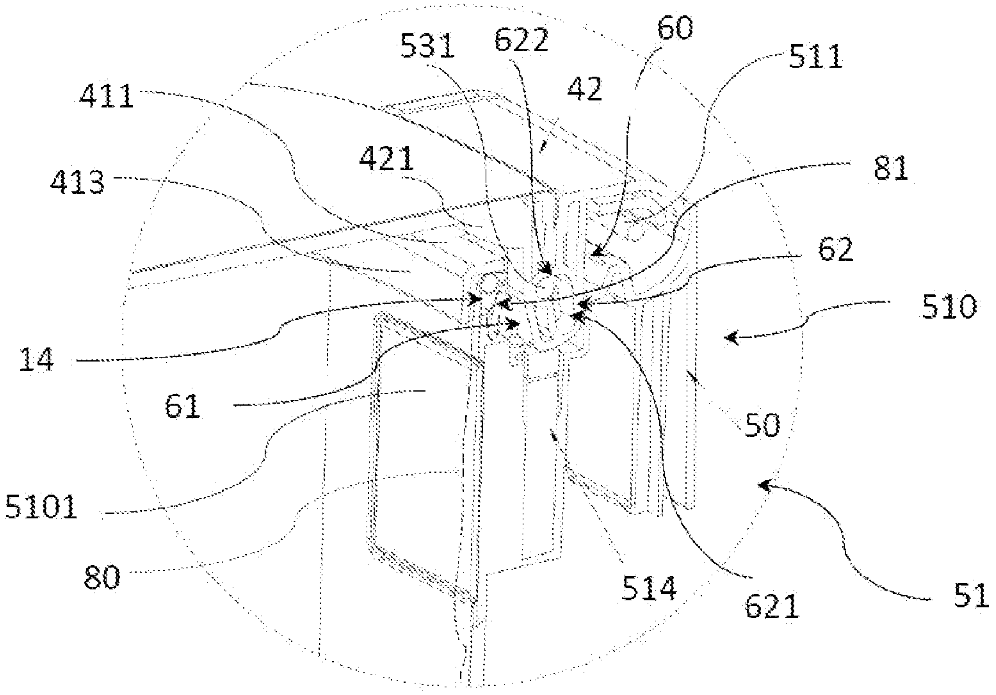
FIG. 14 is an enlarged view of the transition arrangement of the trash can with lid assembly in close state according to the above preferred embodiment of the present invention.
Figure 15:
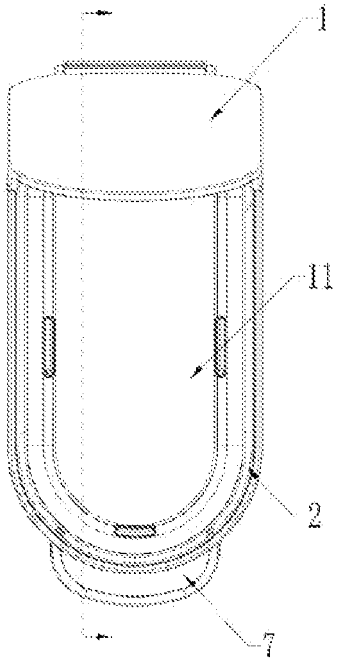
FIG. 15 is a top view of the trash can with lid assembly in open state according to the above preferred embodiment of the present invention.

As shown in FIG. 20, when the lid assembly 40 is in the transition state, both the retainer rim 41 and the rid 42 are uplifted to have the second included angle (larger than 90 degrees from horizontal) A2 that the upper edge 111, the top opening 110 and the receiving cavity 13 of the shell 10 are exposed to the user for placing the trash bag 80 (as shown in dotted lines) in the receiving cavity 13 with the opening portion 81 of the trash bag 80 outwardly and downwardly inverted and folded outside the upper edge 111 of the shell 10. Then, the user may manually and pivotally move the retainer rim 41 downwards back to its normal state to seat on the upper edge 111 of the shell 10 to hold the trash bag 80 in position, as shown in FIGS. 10 and 14.

The link assembly 50 extends from the foot pedal 30 along the base 20 and then upwardly along the shell 10 to the lid 42. Referring to FIGS. 9-10 and 13-14, according to the preferred embodiment, the link assembly 50 comprises a hinge assembly 51 provided to an upper position of the rear side of the shell 10, a pedal bar 52 and a link rod 53. According to the preferred embodiment, referring to the retainer rim 41 is pivotally coupled with the hinge assembly 51 and can be made of metal, plastic or a configuration comprising a plastic inner layer and a metal outer layer. The retainer rim 41 has an annular base 411 that is adapted to be seated on the upper edge 111 of the shell 10, an outer annular wall 412 and an inner annular wall 413 vertically and downwardly extending from the annular base 411 to define a retaining recess 414 therebetween and a shoulder 415 between the outer and inner annular walls 412, 413 and the annular base 411. The outer annular wall 412 is preferred to be made longer than the inner annular wall 413 and the size and shape of the retaining recess 414 are arranged to allow the upper edge 111 of the shell 10 to be fittingly inserted therein until the shoulder 415 sited on the upper edge 111 of the shell, as shown in FIGS. 10 and 14, such that when the retainer rim 41 is manually and pivotally moves downwards back to its normal state to seat on the upper edge 111 of the shell 10, the opening portion 81 of the trash bag 80 is secured in position and covered by the outer wall 412 of the retainer rim 41 from outside. A downward pressing force is applied by the weight of the retainer rim 41 to the upper edge 111 of the shell 10 and the opening portion 81 of the trash bag 80 that significantly secures the trash bag 80 to be mounted in the shell 10 properly.

Referring to FIGS. 12, 13, 16 and 19A-20, the pedal bar 52 is pivotally secured in the base 20 through a pivot axle 521 and extended from a front side to a rear side of the base 20. The foot pedal 30 is provided at a front side of the base 20 and integrally connected to a front end of the pedal bar 52, and a bottom end of the link rod 53 is pivotally coupled to a rear end of the pedal bar 52, as shown in FIGS. 16 and 19A-19B.

The link assembly 50 operates to translate an up and down pivotal motion of the pedal 30 to an up and down pivotal motion for the lid 42. The pedal bar 52 pivotally coupled to the base 20 is capable of pivoting movement about the pivot axle 521. The bottom end of the link rod 53 is preferred to be housed inside the base 20 and the link rod 53 extends upwardly along the rear side of the shell 10 to the hinge assembly 51.

Figure 8:
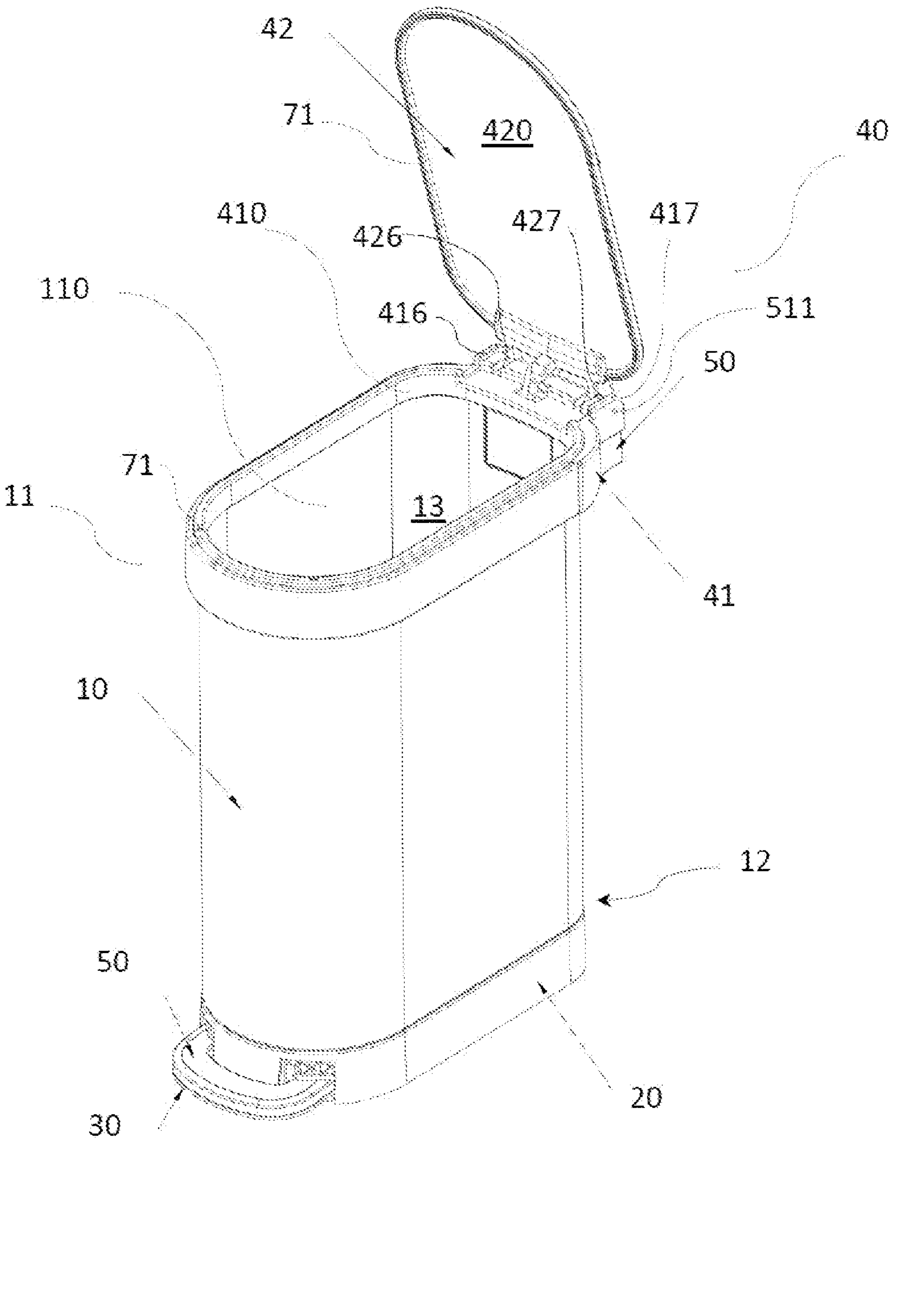
FIG. 8 is a perspective view of the trash can with lid assembly in open state according to the above preferred embodiment of the present invention.
Figure 21:
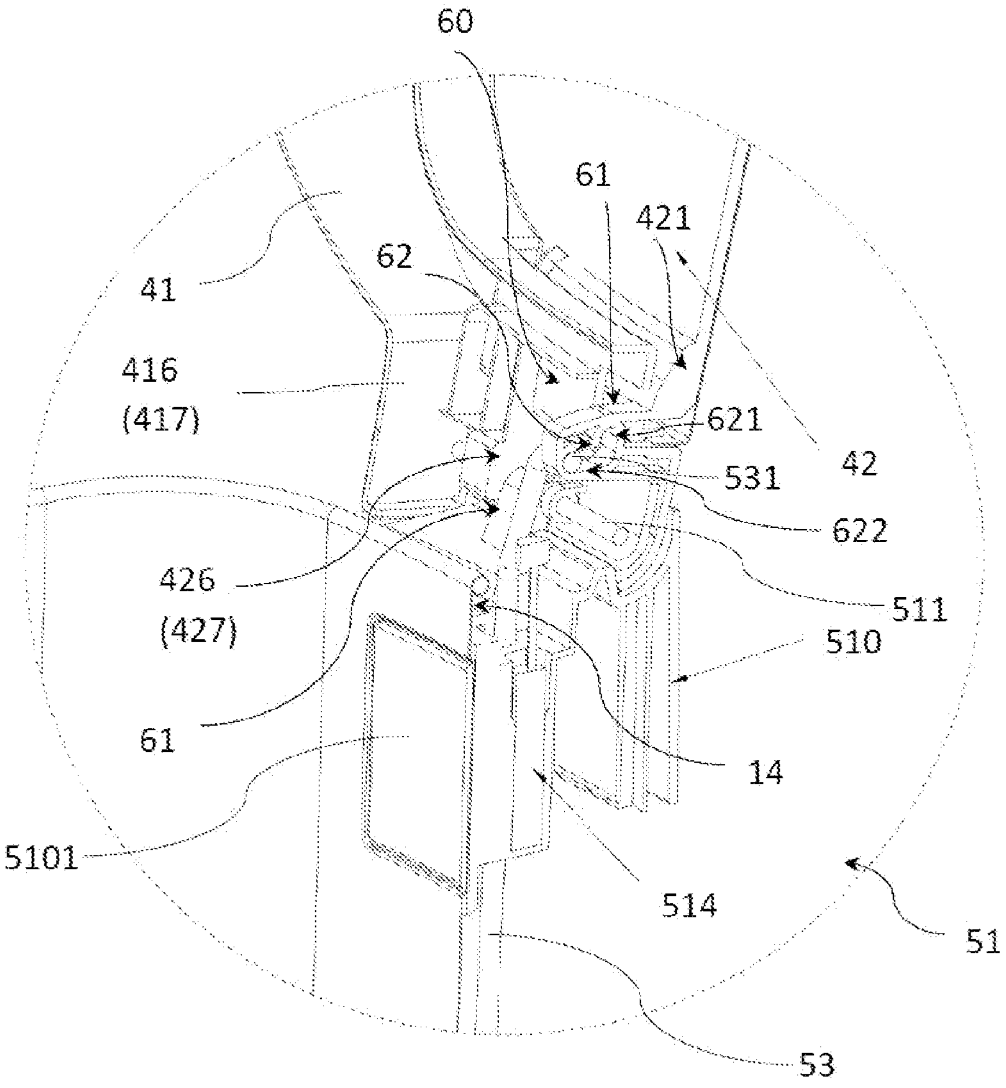
FIG. 21 is an enlarged view of the transition arrangement of the trash can with lid assembly in transition state according to the above preferred embodiment of the present invention.
Figure 22:
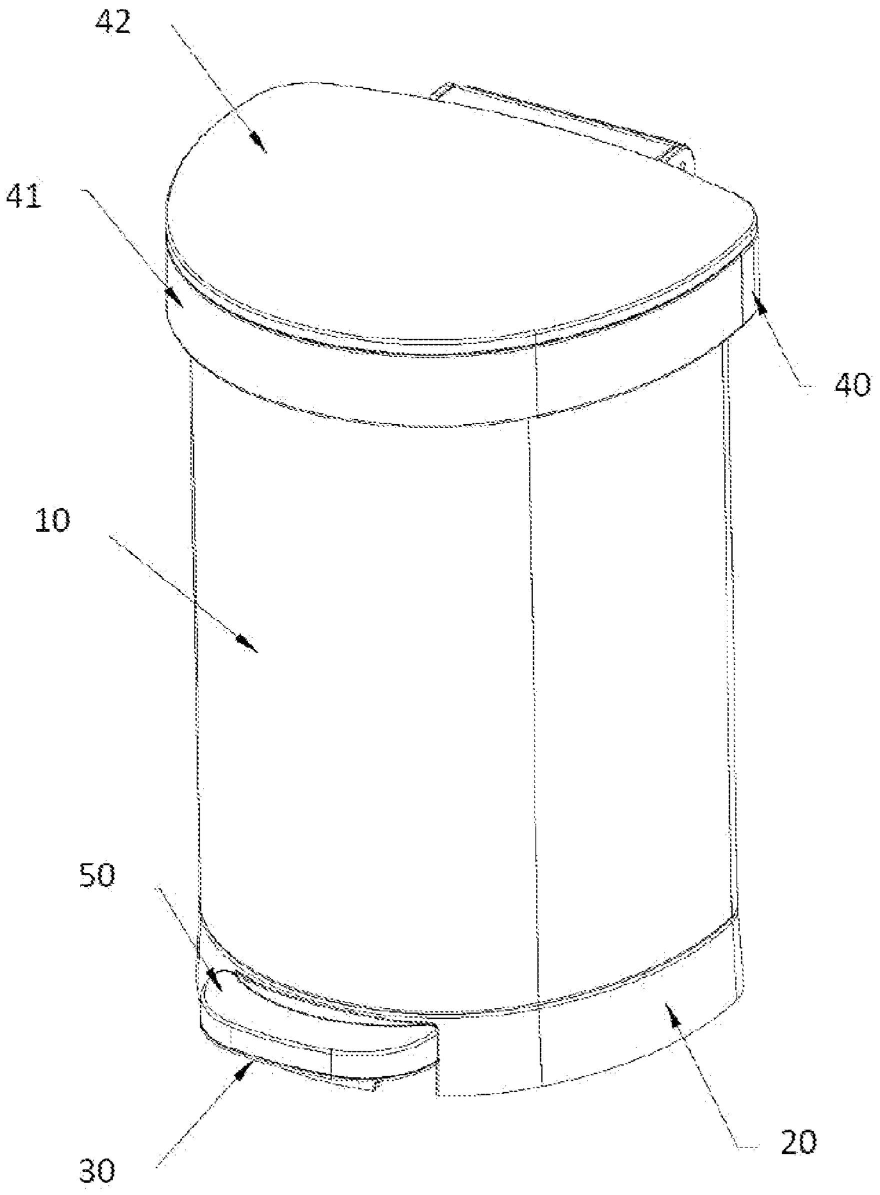
FIG. 22 is a perspective view of a trash can with lid assembly in close state according to an alternative mode of the above preferred embodiment of the present invention.
Figure 23:
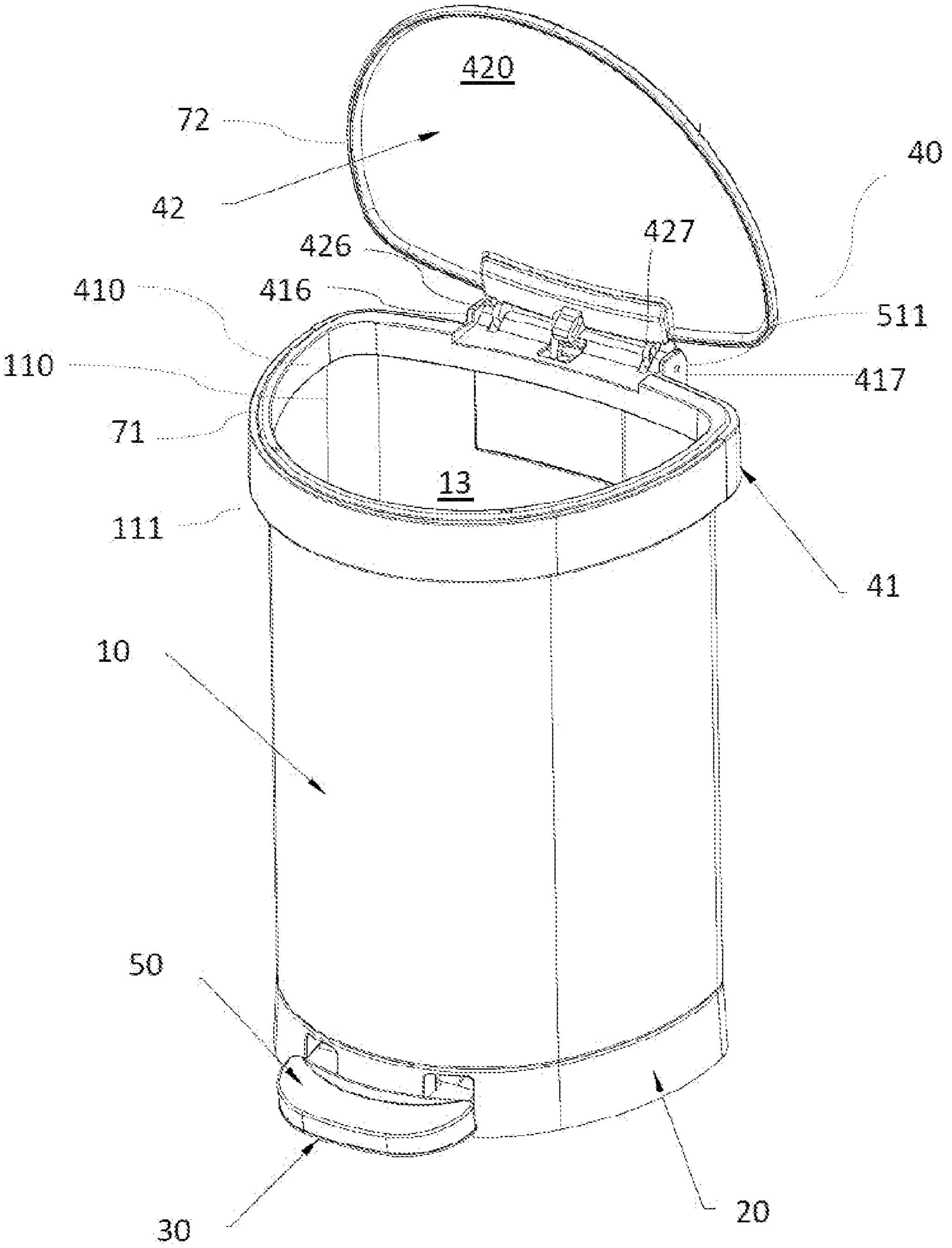
FIG. 23 is a perspective view of the trash can with lid assembly in open state according to the alternative mode of the above preferred embodiment of the present invention.
Figure 24:
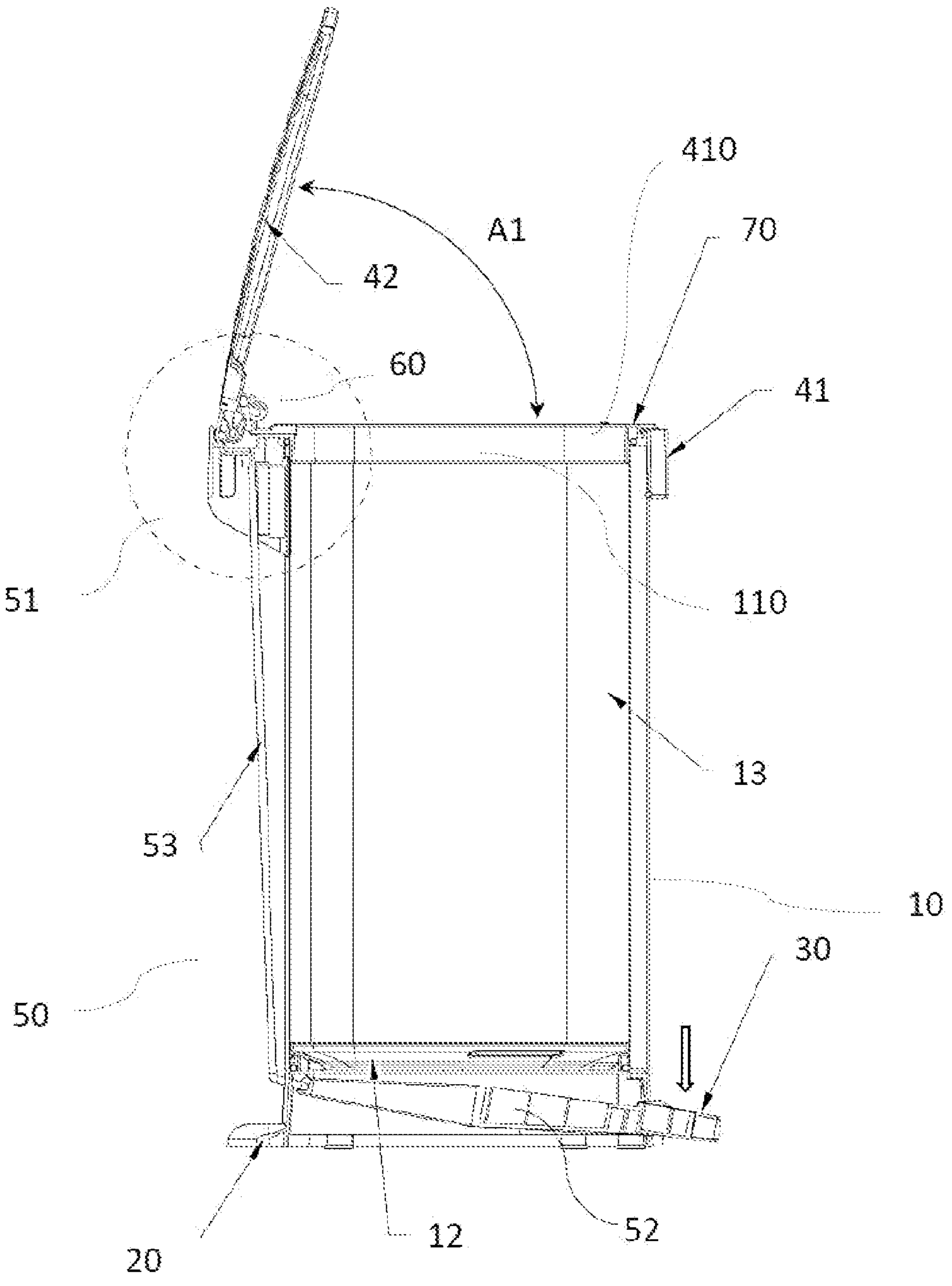
FIG. 24 is a sectional view of the trash can with lid assembly in close state according to the alternative mode of the above preferred embodiment of the present invention.
Figure 25:
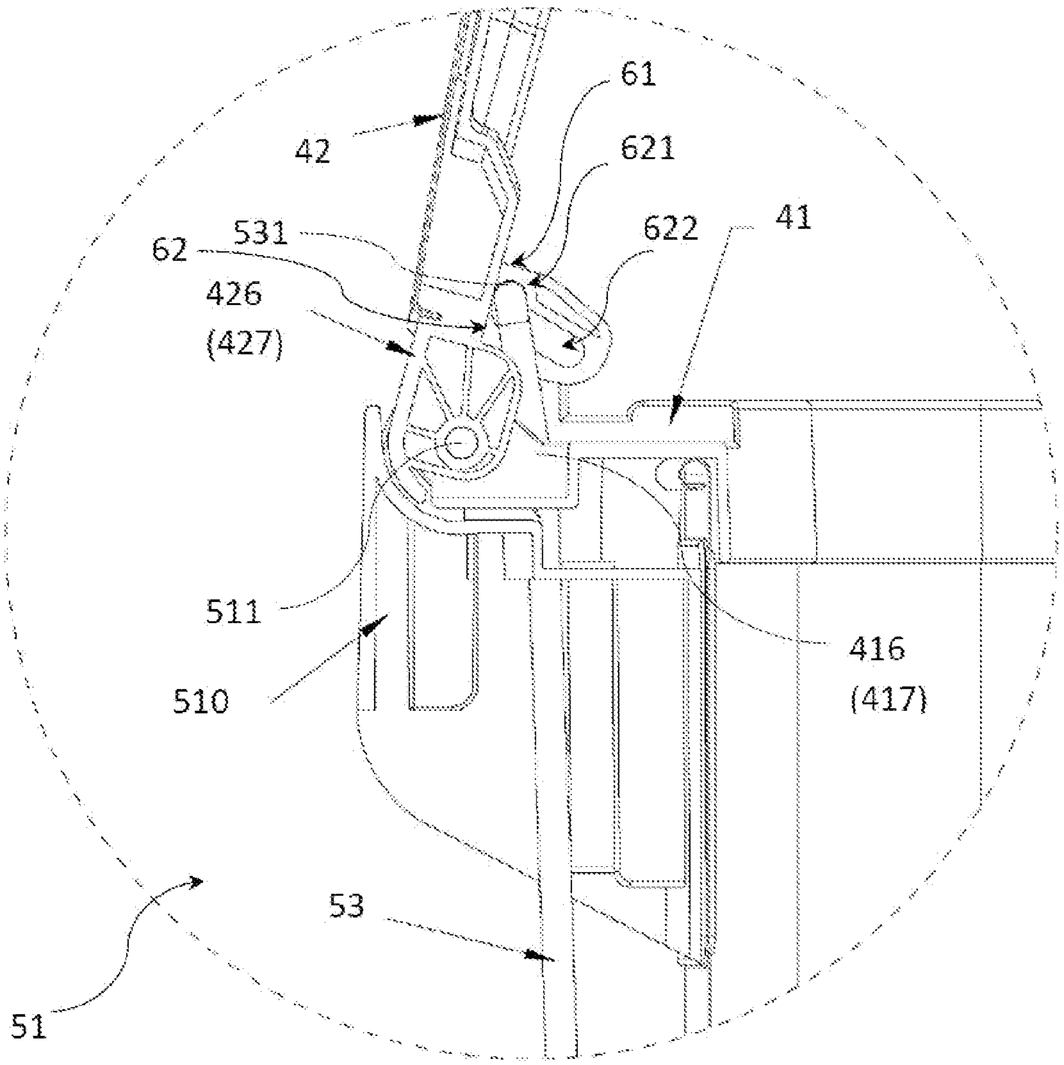
FIG. 25 is an enlarged view of the sealing arrangement of the trash can with lid assembly in close state according to the alternative mode of the above preferred embodiment of the present invention.
Figure 26:
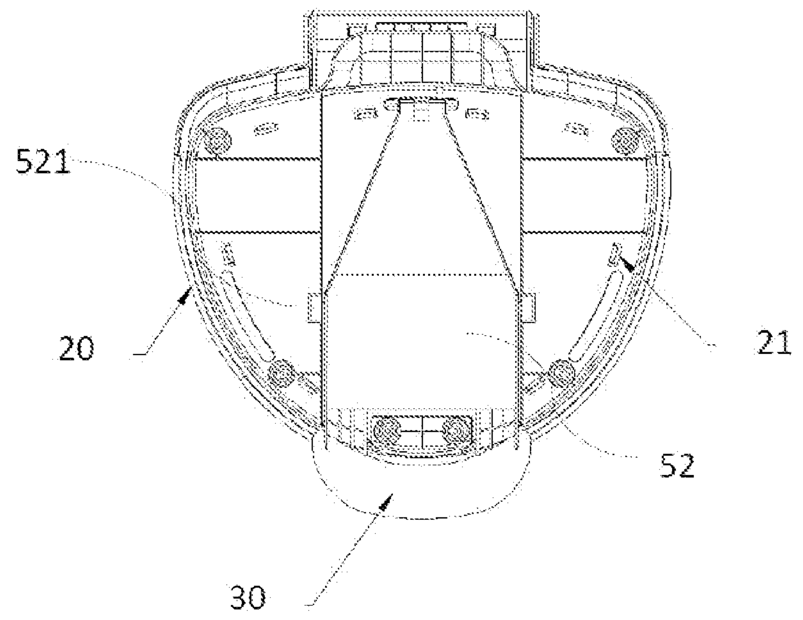
FIG. 26 is a bottom view of the trash can with lid assembly according to the alternative mode of the above preferred embodiment of the present invention.
Figure 27:
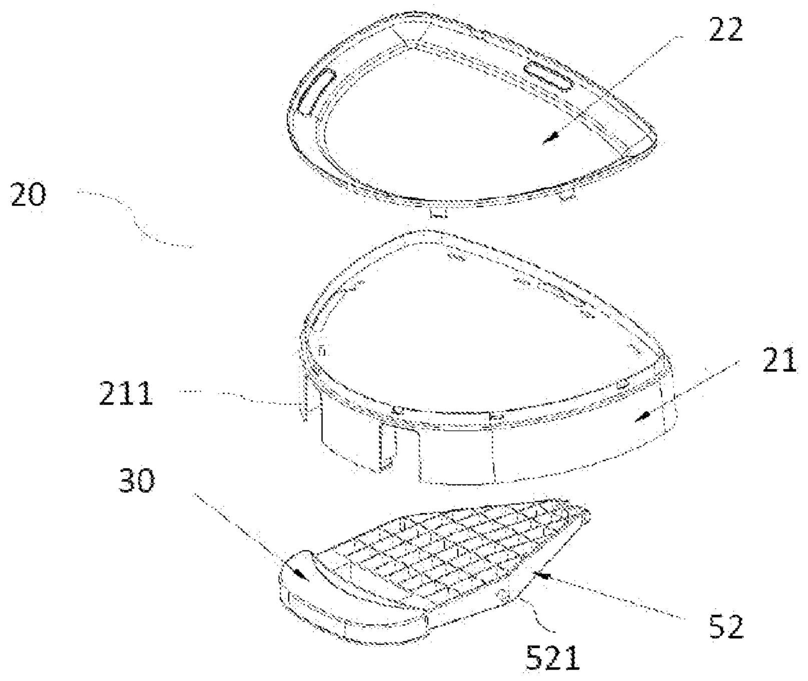
FIG. 27 is an exploded view of the base of the trash can with lid assembly according to the alternative mode of the above preferred embodiment of the present invention.
Figure 28:
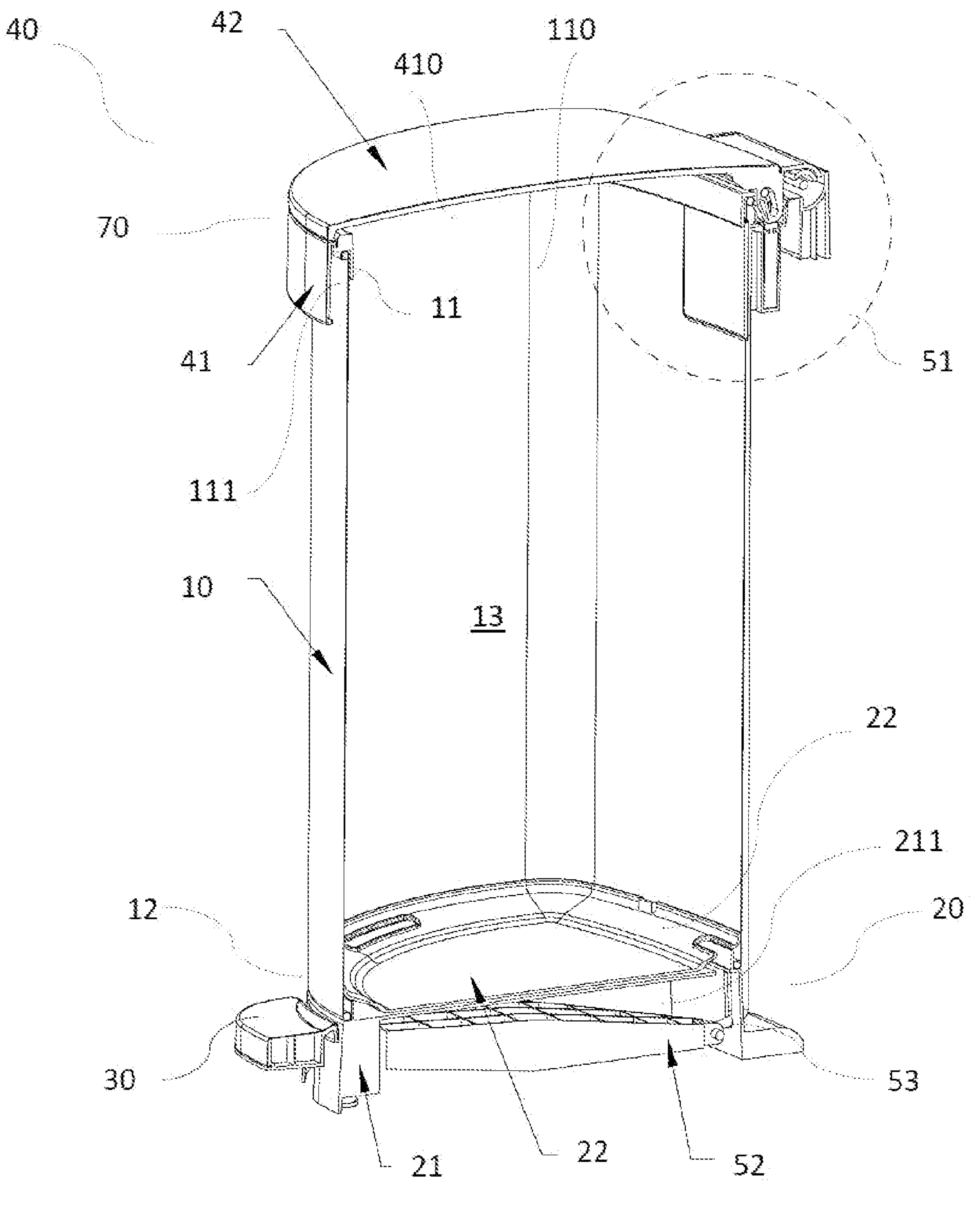
FIG. 28 is sectional perspective view of the trash can with lid assembly in close state according to the alternative mode of the above preferred embodiment of the present invention.
Figure 29:
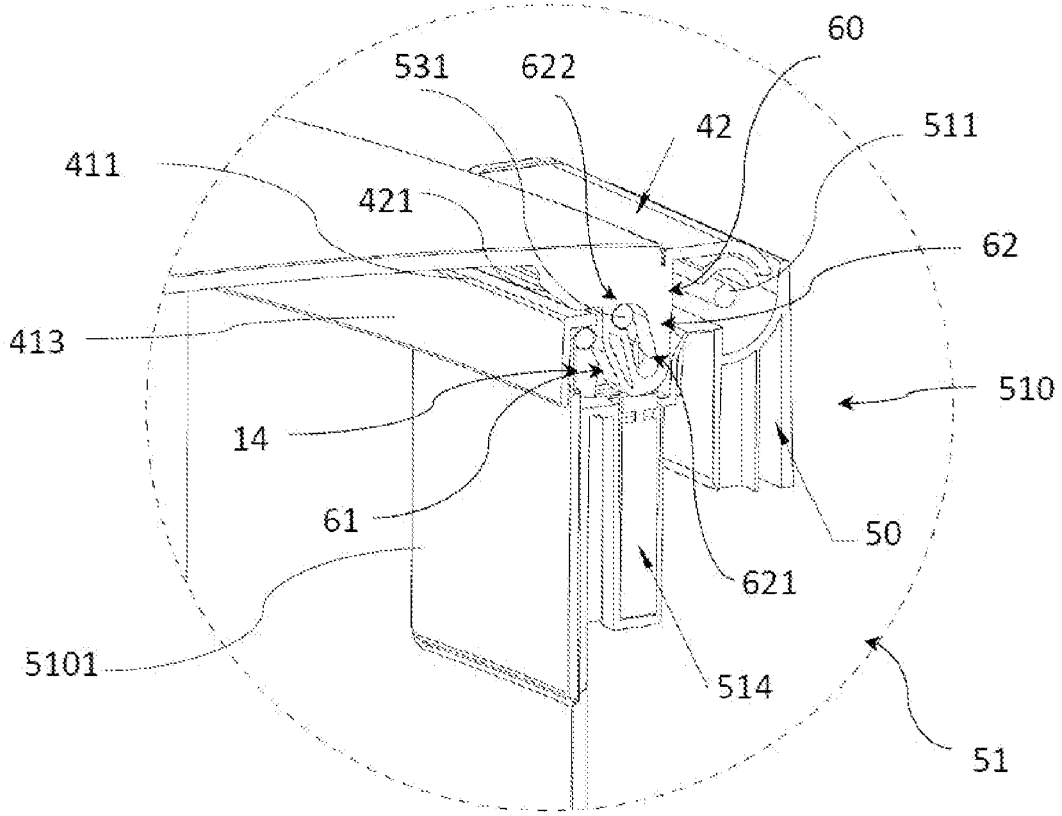
FIG. 29 is an enlarged view of the transition arrangement of the trash can with lid assembly in close state according to the alternative mode of the above preferred embodiment of the present invention.
Figure 30:
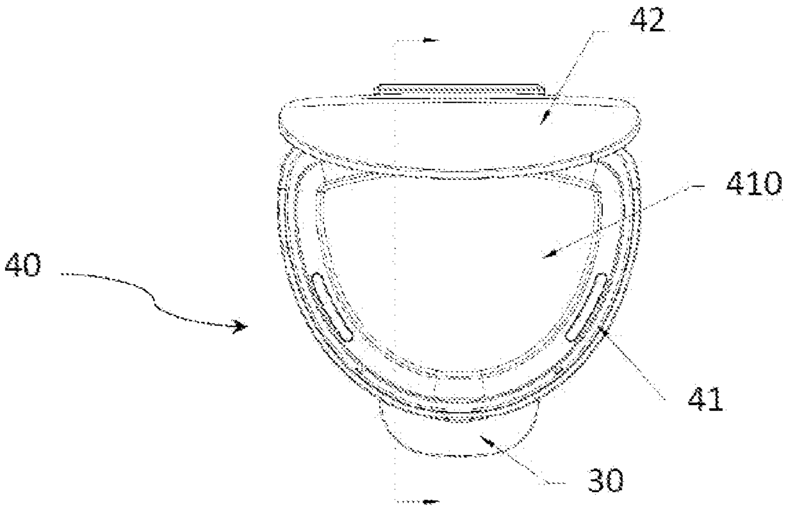
FIG. 30 is a top view of the trash can with lid assembly in open state according to the alternative mode of the above preferred embodiment of the present invention.
Figure 31:
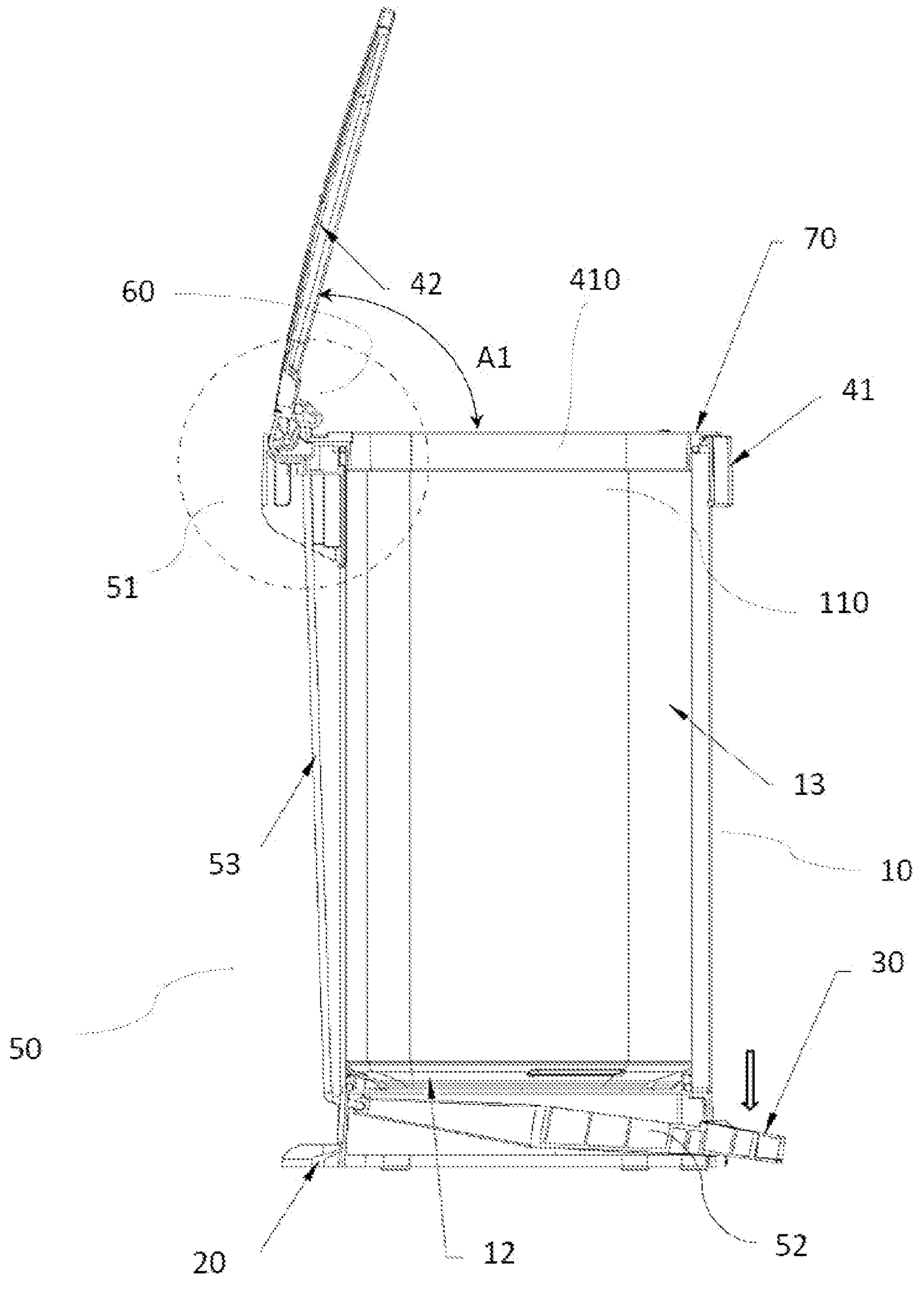
FIG. 31 is a sectional view of the trash can with lid assembly in open state according to the alternative mode of the above preferred embodiment of the present invention.
Figure 32:
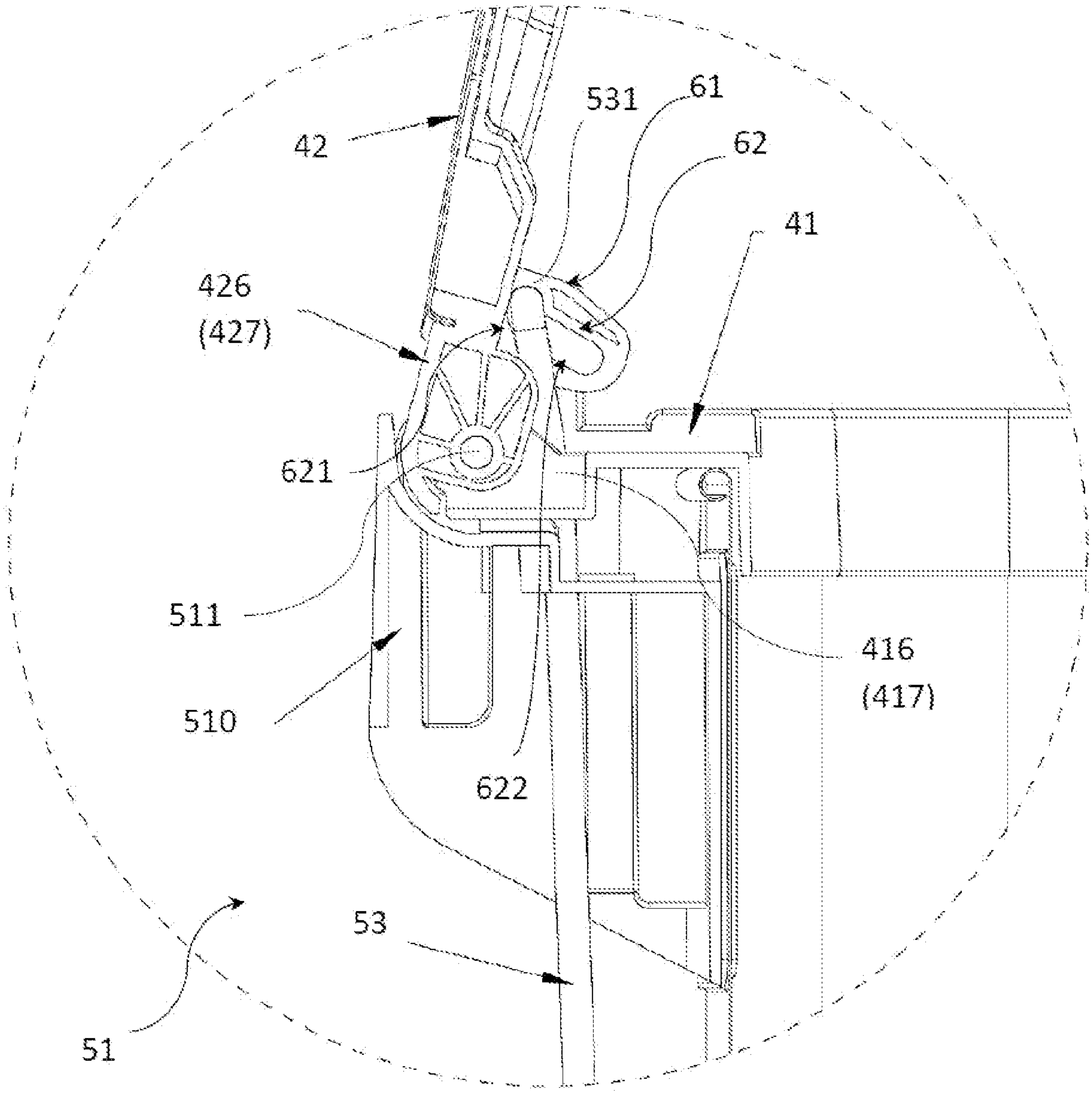
FIG. 32 is an enlarged view of the link assembly of the trash can with lid assembly in open state according to the alternative mode of the above preferred embodiment of the present invention.
Figure 33:
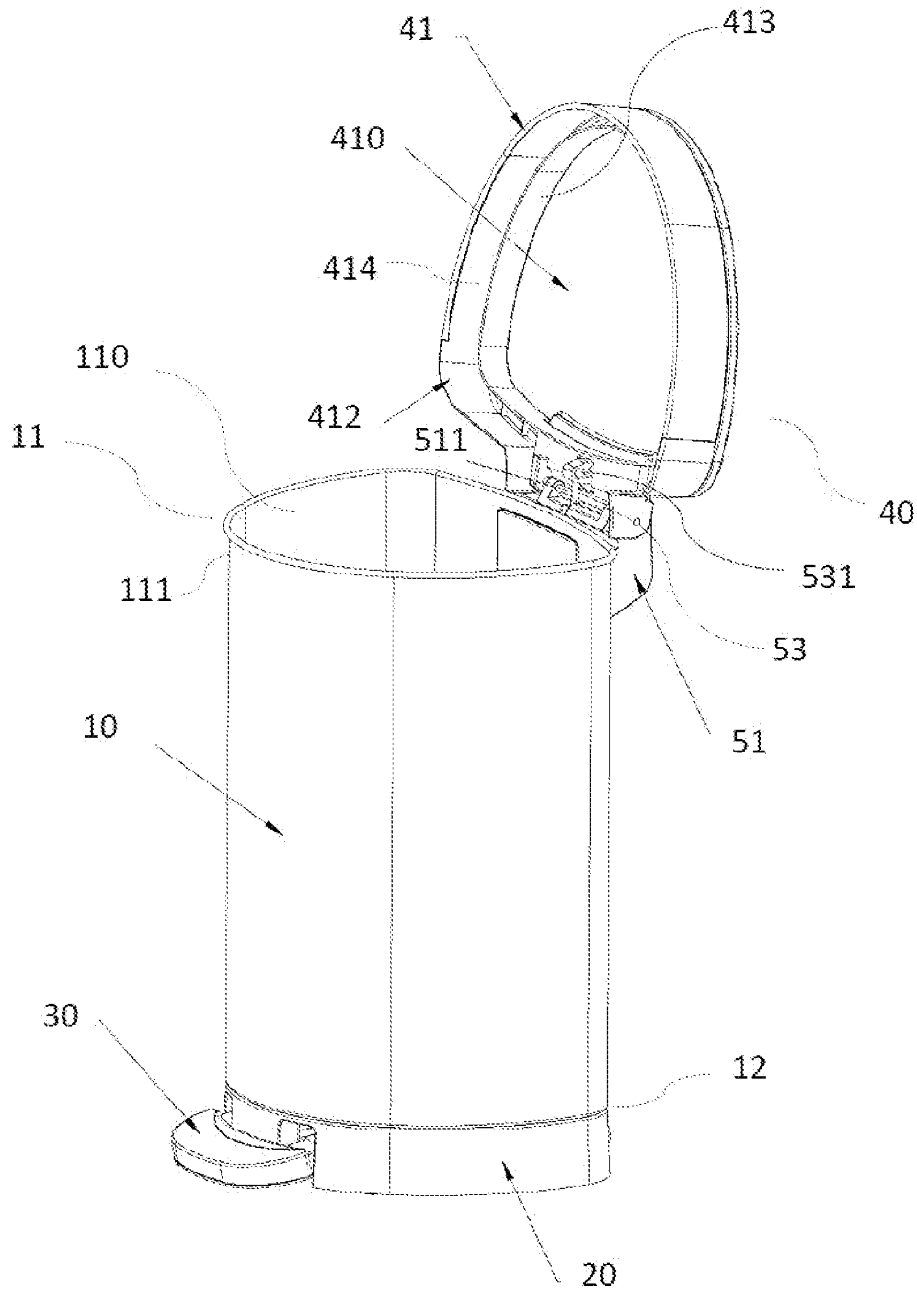
FIG. 33 is a perspective view of the trash can with lid assembly in transition state according to the alternative mode of the above preferred embodiment of the present invention.
Figure 34:
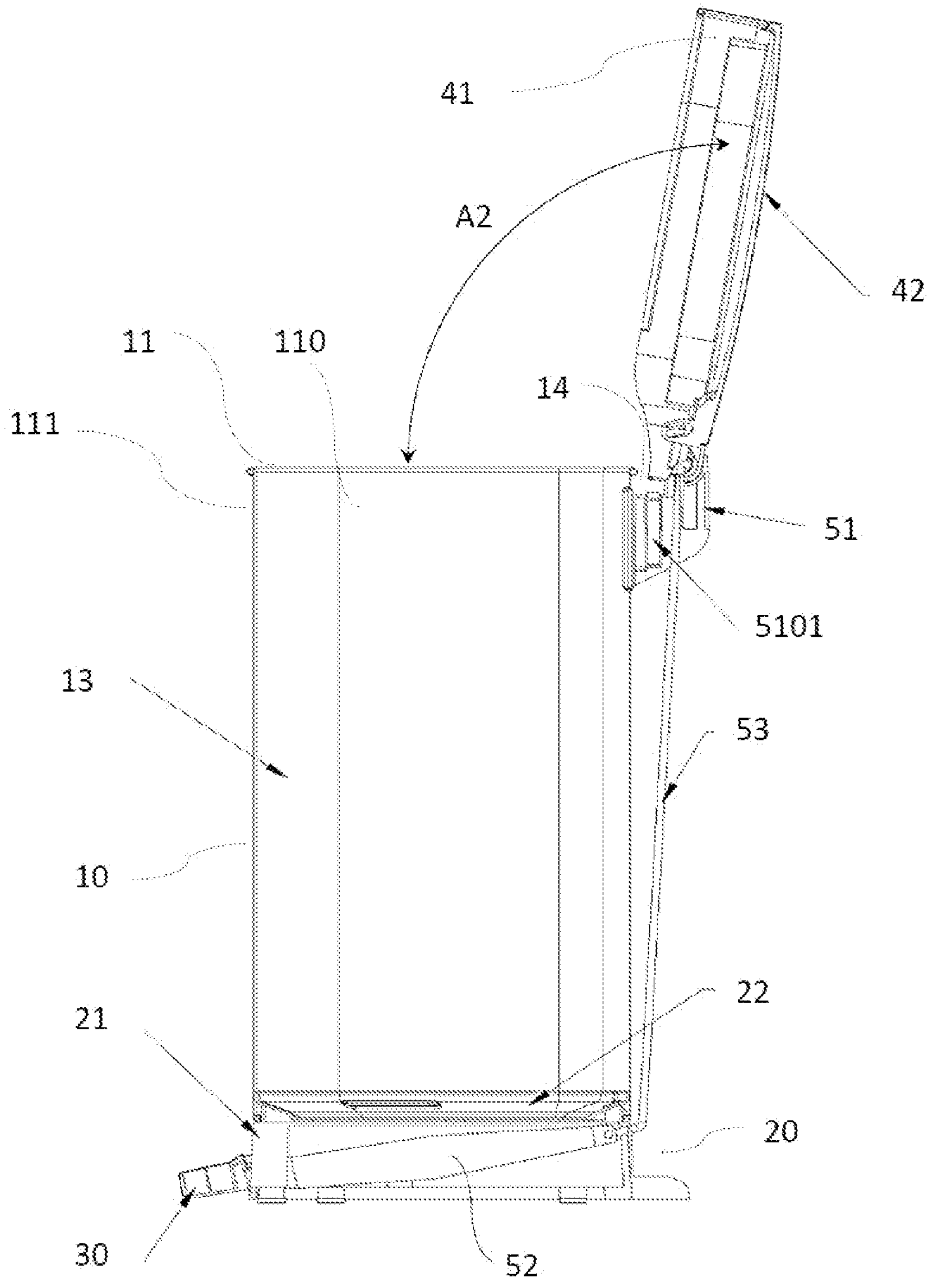
FIG. 34 is a sectional view of the trash can with lid assembly in transition state according to the alternative mode of the above preferred embodiment of the present invention.
Figure 35:
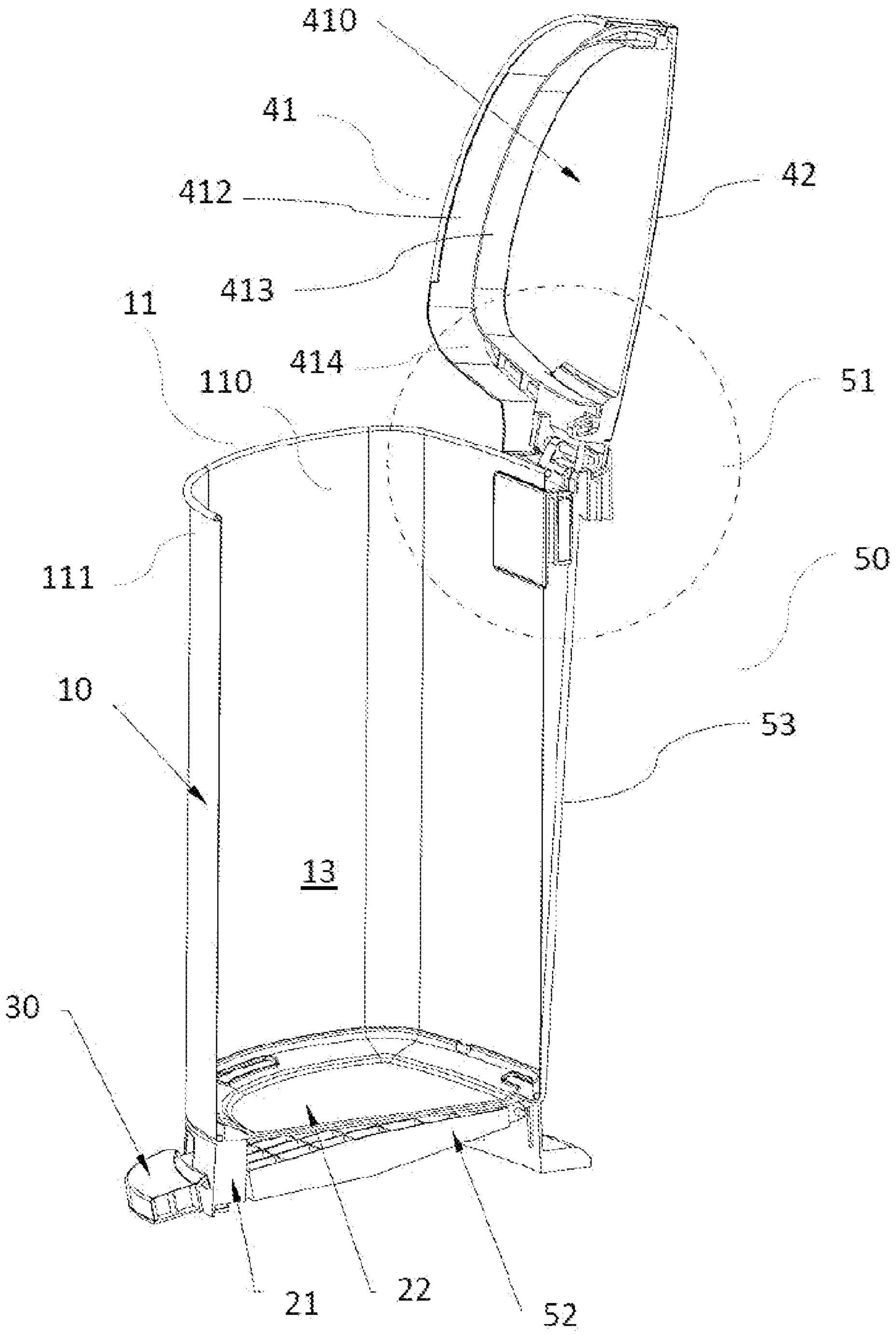
FIG. 35 is a sectional perspective view of the trash can with lid assembly in transition state according to the alternative mode of the above preferred embodiment of the present invention.
Figure 36:
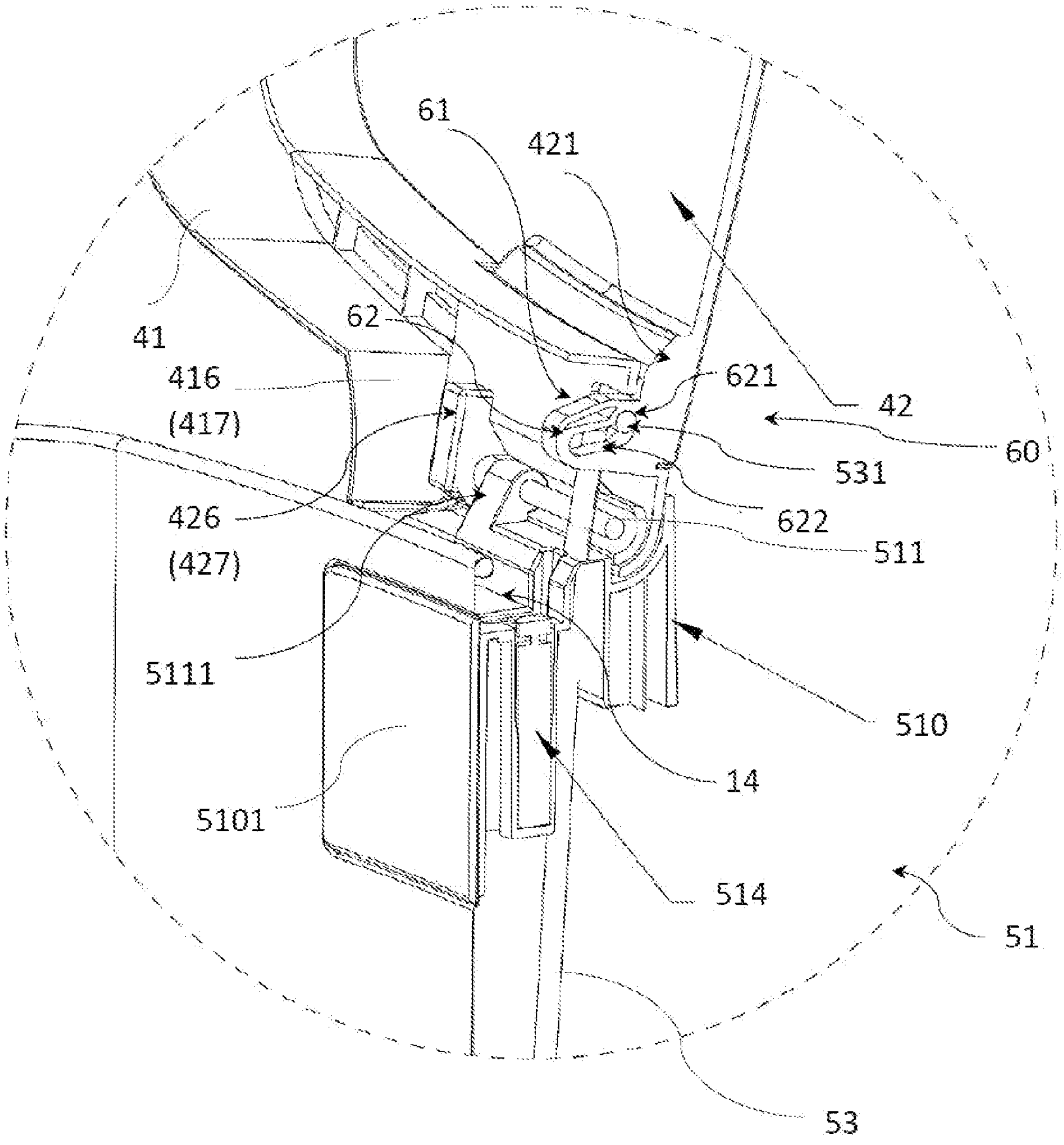
FIG. 36 is an enlarged view of the transition arrangement of the trash can with lid assembly in transition state according to the alternative mode of the above preferred embodiment of the present invention.

The hinge assembly 51 is configured for pivotally coupling the retainer rim 41 and the lid 42 of the lid assembly 40 along a pivot axis defined by a pivot axle 511 which is supported by an axle supporter 5111 formed in the hinge housing 510. The hinge assembly 51 is illustrated in enlarged views in FIGS. 14, 17 and 21. The hinge assembly 51 comprises a hinge housing 510 which comprises a hinge base 5101 mounted to an upper portion of the rear side of the shell 10. The hinge assembly 51 further comprises a pair of first pivot arms 416, 417 integrally and rearwardly extended from a rear side of the retainer rim 41 and a pair of second pivot arms 426, 427 integrally and rearwardly extended from a rear side of the lid 42, as shown in FIGS. 8 and 21, wherein the pair of second pivot arms 426, 427 is positioned between the pair of first pivot arms 416, 417. Each of the first and second pivot arms 416, 417, 426, 427 has a through hole configured for the pivot axle 511 extending therethrough, such that both the retainer rim 41 and the lid 42 are able to be operated to pivotally rotate about the pivot axle 511 at the same time or independently.

The hinge housing 510 is secured to an outer surface of the upper portion of the rear side of the shell 10 by means of the hinge base 5101 below the upper end 11 of the shell 10 so as to define a retaining gap 14 between the upper edge 111 of said shell 10 and the hinge base 5101 of said hinge housing 510, as illustrated in FIGS. 14, 19B and 21. In other words, the retaining gap 14 is formed between the hinge assembly 51 of the link assembly 50 and the upper edge 111 of the shell 10 for a respective portion of the opening portion 81 of the trash bag 80 to be folded and retained therein (as shown in FIG. 14). The depth of the retaining gap 14 can be controlled by the mounting position of the hinge base 5101 to the shell 10, the lower the hinge housing 510 is located, the deeper is the retaining gap 14.

Figure 17:
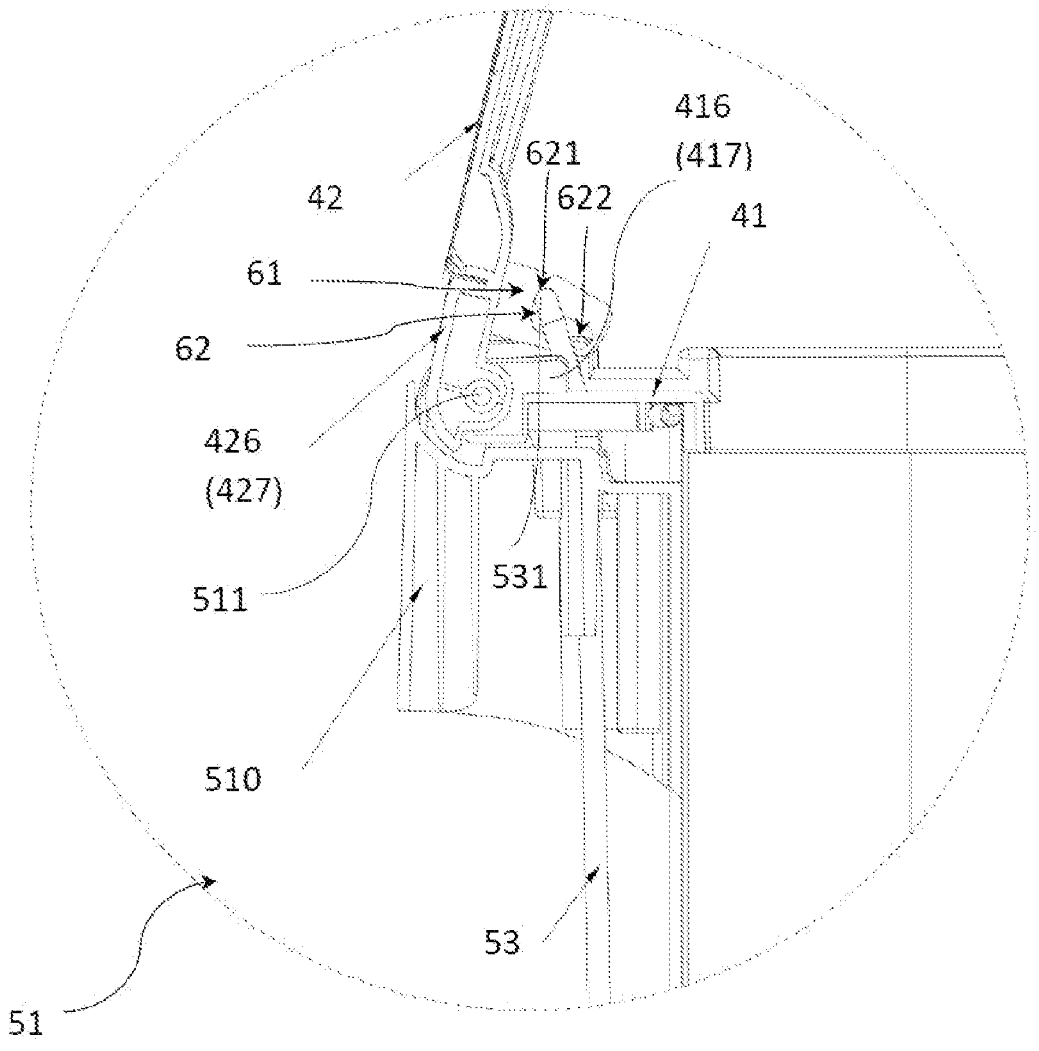
FIG. 17 is an enlarged view of the link assembly of the trash can with lid assembly in open state according to the above preferred embodiment of the present invention.

Referring to FIGS. 14, 17-18 and 21, a top portion of the link rod 53 has a hooked driving stud 531 provided thereto and extending through the hinge housing 510. The transition arrangement 60 comprises a pivot holder 61 integrally extended from an inner surface of the lid 42 via a holder support 421 protruded from the inner surface of the lid 42. The pivot holder 61 has a L shaped transition slot 62 defining an upper slot portion 621 and a lower slot portion 622, wherein the driving stud 531 is movably inserted into the transition slot 62 such that the driving stud 531 is normally retained for pivoting motion in the upper slot portion 621 of the transition slot 62, as shown in FIG. 17. When the lid 42 is fully opened, the user may manually push the driving stud 531 into the lower slot portion 622 of the transition slot 62, which will then secure the lid 42 in the transition state, as shown in FIG. 21, until the driving stud 531 is disengaged from the lower slot portion 622 of the transition slot 62.

Accordingly, when the driving stud 531 is normally positioned in the upper slot portion 621 of the transition slot 62, the movement of the lid 42 is limited to be operated by the foot pedal 30 to lift up to the first included angle A1, wherein as long as the foot pedal 30 is pressed down as shown in FIG. 16, the lid 42 is driven to the open state as shown in FIGS. 16 and 17, wherein when the pressing force applied to the foot pedal 30 is removed, since the lid 42 is having the first included angle A1 from retainer rim 41, the weight of the lid 42 will move to lid 42 to drop down back to its close state, as shown in FIGS. 13 and 14, due to gravity. To slow down the down falling motion of the lid 42, the hinge assembly 51 further comprises a damper 514, as shown in FIGS. 14 and 21, housed by the hinge housing 510 to position below the pivot holder 61 to slow down the movement of the pivot holder 61 while the lid 42 is falling down back to its close state.

When the lid 42 is operated by the stepped down foot pedal 30 to the open state, the driving stud 531 is allowed to be adjusted and moved into the lower slot portion 622 of the transition slot 62, as shown in FIGS. 18-21, and the lid 42 is able to be further rotated about the pivot axle 511 rearwards to have the second included angle A2 from the upper end 11 of the shell 10 to lock the lid 42 in its transition state while the foot pedal 30 is also retained in the stepped down position, as shown in FIGS. 19A and 19B, wherein the weight of the lid 42 can retain the lid 42 in this transition state, as shown in FIG. 19A, and the rim opening 410 of retainer rim 41 and the top opening 110 of the shell 10 are exposed to outside, such that the trash can is remained in open state for the user to dispose trash or waste continuously without repeatedly stepping down the foot pedal 30. During such transition state, the user may further lift the retainer rim 41 up to drive the retainer rim 41 to upwardly rotate about the pivot axle 511 until the retainer rim 41 is positioned at the second included angle A2 for replacing the trash bag 80, as shown in FIGS. 19B and 20. After a new trach bag 80 is replaced, the user may simply move the retainer rim 41 back from its transition state to its normal state, resting on the upper end 11 of the shell 10 to secure the opening portion 81 of the trash bag 80 around the upper edge 111 of the shell 10. According to the preferred embodiment, the transition assembly 60 takes advantage of the gravity to avoid additional component and complicated structure that substantially simplifies the configuration of the trash can, lowers its manufacturing cost and reduces the possibility of malfunction and failure in operation of the lid assembly.

Figure 9:
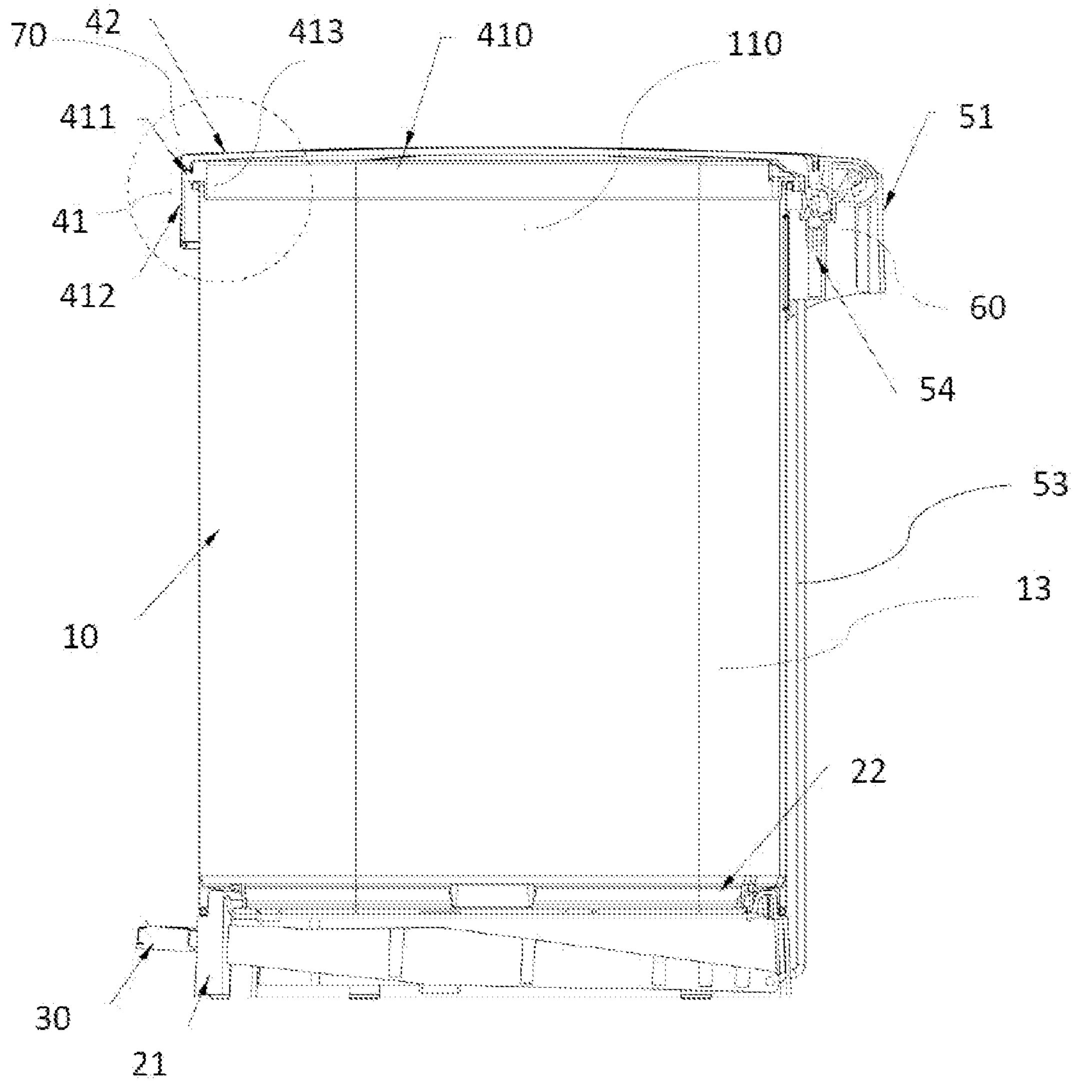
FIG. 9 is a sectional view of the trash can with lid assembly in close state according to the above preferred embodiment of the present invention.

Referring to FIGS. 8-10, the sealing arrangement 70 is provided between an engagement the lid 42 and the retainer rim 41 while the lid 42 is sited and seated on the retainer rim 41. The sealing arrangement 70 is constituted by a circular sealing slot 71 indented in a top ring surface 418 of the retainer rim 41 which is extended around the rim opening 410 and a circular ridge 72 is protruded on a bottom surface 420 of the lid 42, which is sized and shaped to engage with the sealing slot 71 so as to provide a zig-zag engagement sealing effect for the lid assembly 40, as shown in FIGS. 8 and 10, to prevent odor inside the trash can from leaking. It is appreciated that sealing materials such as rubber or the like can be coated on the surfaces of the sealing slot 71 and the ridge 72 so as to enhance the sealing ability.

Figure 7:
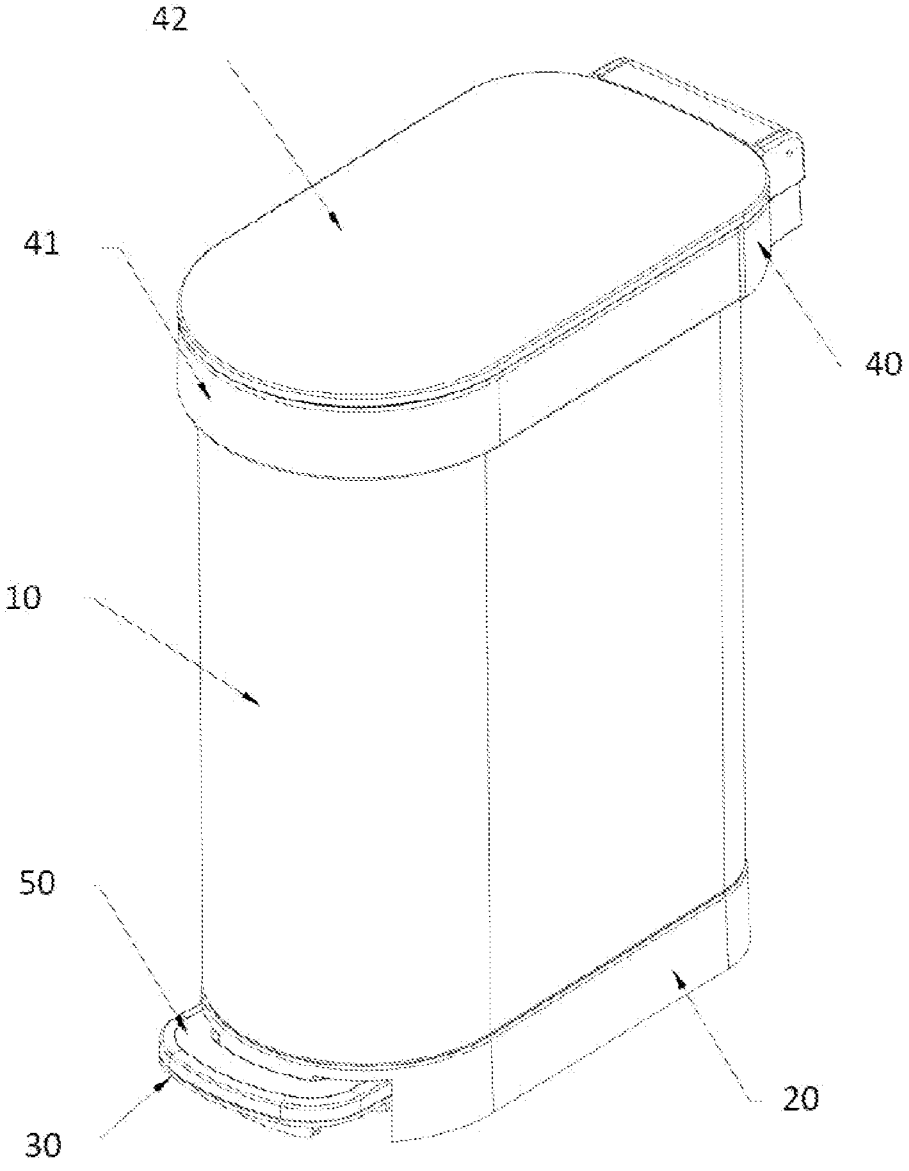
FIG. 7 is a perspective view of a trash can with lid assembly in close state according to a preferred embodiment of the present invention.

According to the preferred embodiment, referring to FIGS. 7, 9 and 10, a predetermined outer size of the retainer rim 41 and an outer size of the lid 42 are arranged to be the same so that the lid 42 can be fittingly sited on the retainer rim 41 while the bottom surface 420 of the lid 42 can be seated on the top ring surface 418 of the retainer rim 41 in the close state, as shown in FIG. 10. The lid 42 has a panel configuration without any surrounding flange such that the lid 42 is arranged to overlappingly site on the retainer rim 41 while an outer surrounding side 422 of the lid 42 is aligned with the outer annular wall 412 of the retainer rim 41 to provide a neat appearance and sealing effect for ease of cleaning and allowing the trash can to be located against a wall surface with its side, as shown in FIG. 7, while the lid 42 can still be smoothly lifting up and down to open and close the trash can. It is further appreciated that such overlapping configuration of the lid 42 on the retainer rim 41 allows the user to observe from outside whether the lid 42 has completely closed the top opening 110 of the shell 10 that is important to prevent the odor of the trash and waste collected in the trash can from leaking. Especially when the trash can is fully loaded with trash and waste, the downwardly extending flange of the conventional lid may prevent the user to observe whether lid is fully closed. According to the present invention, when the user finds the lid 42 failing to completely and overlappingly seat on the retainer rim 41, it is the time to replace the trash bag 80.

As shown in FIG. 10, in order to enhance the sealing ability of the lid 42, according to preferred embodiment, the sealing slot 71 is configured to be an outer open slot surrounding a convex sealing surface 711 formed around annular base 411. Correspondingly, the ridge 72 has an inner concave sealing surface 721 shaped and sized with respect to the convex sealing surface 711, such that the concave sealing surface 721 of said lid 42 is engaged with the convex sealing surface 711 of said retainer rim 41 when the lid 42 is in the close state. In other words, when the lid 42 is normally in the close state, the weight of the lid 42 will apply a pivot downward force F about the pivot axle 511 to press the concave sealing surface 721 against the convex sealing surface 711 due to gravity to ensure a better air-tight effect to conseal the receiving cavity 13 from outside.

Referring to FIGS. 22 to 36, an alternative mode of the trash can with lid assembly according to the preferred embodiment of the present invention is illustrated, which has the same structure of the trash can as shown in FIGS. 8 to 21 and the different is the shape of the shell 10 the lid assembly 40. It is intended to illustrate the structure and the operation method of the trash can of the present invention can be applied to all kinds of trash can in different shapes and sizes. It is worth mentioning that the sealing arrangement 70 as illustrated in FIG. 10 of the preferred embodiment is also configured in the alternative mode of as shown in the FIGS. 22-36.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A trash can for mounting a trash bag therein, comprising:

a tubular shell having an upper end defining a top opening, a lower end and a receiving cavity defined therein for receiving the trash bag therein;

a base mounted to said lower end of the shell;

a foot pedal pivotally coupled at a side of said base;

a lid assembly, comprising:

a retainer rim, having a predetermined outer size and a rim opening, pivotally coupled to said shell is such a manner that said retainer rim is able to be selectively moved to site on an upper edge of said shell while said rim opening is communicating with said receiving cavity through said top opening of said shell or pivotally lifted up from said upper edge of said shell, wherein said retainer rim has a top ring surface and a circular sealing slot indented in said top ring surface and extended around said rim opening, and a lid pivotally mounted to said shell and configured to selectively move between an open state and a close state, wherein an outer size of said lid is the same as said predetermined outer size of said retainer rim, such that in the close state, said lid fittingly sits on said retainer rim to cover said rim opening of said retainer rim and said top opening of said shell while a bottom surface of said lid seats on said top ring surface of said retainer rim and an outer surrounding side of said lid is aligned with an outer annular wall of said retainer rim, wherein said lid has a circular ridge protruded on said bottom surface of said lid and sized and shaped to engage with said sealing slot to form a sealing arrangement;

a link assembly coupling said foot pedal to said lid in such a manner that said lid is able to be lifted up pivotally from said retainer rim to said open state in response to a pressing force applied to said foot pedal, wherein in said open state, said lid is pivotally lifted up to have an included angle of 90 degrees or less from said retainer rim sited on said upper of said shell, and said lid falls back to said close state when the pressing force applied to said foot pedal is released; and a transition arrangement coupled with said lid of said lid assembly that enables said lid to be selectively transited between a normal state and a transition state, wherein in said normal state, said lid is operable between said open state and said close state through said foot pedal, wherein when said lid is pivotally lifted up to have said included angle larger than 90 degrees, said lid is in said transition state and would not fall back toward said retainer rim, such that said receiving cavity is remained opened through said top opening of said shell and said rim opening of said retainer rim, and that said retainer rim is able to be pivotally lifted up to rest against said lid for replacing the trash bag in said shell and inverting an opening portion of the trash bag over said upper edge of said shell until said retainer rim is moved back to site on said upper edge of said shell to sandwich the opening portion of the trash bag between said upper edge of said shell and said retainer rim.

2. The trash can, as recited in claim 1, wherein said sealing slot of said retainer rim has a convex sealing surface formed therearound and said ridge of said lid has an inner concave sealing surface shaped and sized with respect to said convex sealing surface, such that said concave sealing surface of said lid is engaged with said convex sealing surface of said retainer rim when said lid is in said close state, thereby a weight of said lid applies a pivot downward force to press said concave sealing surface against said convex sealing surface during said close state of said lid.

3. A trash can for mounting a trash bag therein, comprising:

a tubular shell having an upper end defining a top opening, a lower end and a receiving cavity defined therein for receiving the trash bag therein;

a base mounted to said lower end of the shell;

a foot pedal pivotally coupled at a side of said base;

a lid assembly, comprising:

a retainer rim, having a predetermined outer size and a rim opening, pivotally coupled to said shell is such a manner that said retainer rim is able to be selectively moved to site on an upper edge of said shell while said rim opening is communicating with said receiving cavity through said top opening of said shell or pivotally lifted up from said upper edge of said shell, wherein said retainer rim has a top ring surface and a circular sealing slot indented in said top ring surface and extended around said rim opening, and a lid pivotally mounted to said shell and configured to selectively move between an open state and a close state, wherein an outer size of said lid is the same as said predetermined outer size of said retainer rim, such that in the close state, said lid fittingly sits on said retainer rim to cover said rim opening of said retainer rim and said top opening of said shell while a bottom surface of said lid seats on said top ring surface of said retainer rim and an outer surrounding side of said lid is aligned with an outer annular wall of said retainer rim, wherein said lid has a circular ridge protruded on said bottom surface of said lid and sized and shaped to engage with said sealing slot to form a sealing arrangement;

a link assembly coupling said foot pedal to said lid in such a manner that said lid is able to be lifted up pivotally from said retainer rim to said open state in response to a pressing force applied to said foot pedal, wherein in said open state, said lid is pivotally lifted up to have an included angle of 90 degrees or less from said retainer rim sited on said upper of said shell, and said lid falls back to said close state when the pressing force applied to said foot pedal is released, wherein a retaining gap is formed between said link assembly and said upper edge of said shell for a respective portion of the opening portion of said trash bag to be folded and retained therein; and a transition arrangement coupled with said lid of said lid assembly that enables said lid to be selectively transited between a normal state and a transition state, wherein in said normal state, said lid is operable between said open state and said close state through said foot pedal, wherein when said lid is pivotally lifted up to have said included angle larger than 90 degrees, said lid is in said transition state and would not fall back toward said retainer rim, such that said receiving cavity is remained opened through said top opening of said shell and said rim opening of said retainer rim, and that said retainer rim is able to be pivotally lifted up to rest against said lid for replacing the trash bag in said shell and inverting an opening portion of the trash bag over said upper edge of said shell until said retainer rim is moved back to site on said upper edge of said shell to sandwich the opening portion of the trash bag between said upper edge of said shell and said retainer rim.

4. The trash can, as recited in claim 3, wherein said sealing slot of said retainer rim has a convex sealing surface formed therearound and said ridge of said lid has an inner concave sealing surface shaped and sized with respect to said convex sealing surface, such that said concave sealing surface of said lid is engaged with said convex sealing surface of said retainer rim when said lid is in said close state, thereby a weight of said lid applies a pivot downward force to press said concave sealing surface against said convex sealing surface during said close state of said lid.

5. A trash can for mounting a trash bag therein, comprising:

a tubular shell having an upper end defining a top opening, a lower end and a receiving cavity defined therein for receiving the trash bag therein;

a base mounted to said lower end of the shell;

a foot pedal pivotally coupled at a side of said base;

a lid assembly, comprising:

a retainer rim, having a predetermined outer size and a rim opening, pivotally coupled to said shell is such a manner that said retainer rim is able to be selectively moved to site on an upper edge of said shell while said rim opening is communicating with said receiving cavity through said top opening of said shell or pivotally lifted up from said upper edge of said shell, wherein said retainer rim has a top ring surface and a circular sealing slot indented in said top ring surface and extended around said rim opening, and a lid pivotally mounted to said shell and configured to selectively move between an open state and a close state, wherein an outer size of said lid is the same as said predetermined outer size of said retainer rim, such that in the close state, said lid fittingly sits on said retainer rim to cover said rim opening of said retainer rim and said top opening of said shell while a bottom surface of said lid seats on said top ring surface of said retainer rim and an outer surrounding side of said lid is aligned with an outer annular wall of said retainer rim, wherein said lid has a circular ridge protruded on said bottom surface of said lid and sized and shaped to engage with said sealing slot to form a sealing arrangement;

a link assembly coupling said foot pedal to said lid in such a manner that said lid is able to be lifted up pivotally from said retainer rim to said open state in response to a pressing force applied to said foot pedal, wherein in said open state, said lid is pivotally lifted up to have an included angle of 90 degrees or less from said retainer rim sited on said upper of said shell, and said lid falls back to said close state when the pressing force applied to said foot pedal is released, wherein said link assembly comprises a hinge assembly which comprises a hinge housing mounted to an upper position of a rear side of said shell and a pivot axle supported in said hinge housing and pivotally hinged with said retainer rim and said lid such that said retainer rim and said lid are able to be pivotally rotated about said pivot axle to selectively open or close said lid and to lift up said retainer rim, wherein said hinge housing is positioned below said upper end of said shell to define a retaining gap between said upper edge of said shell and said hinge housing for a respective portion of the opening portion of the trash bag to be folded and retained therein; and a transition arrangement coupled with said lid of said lid assembly that enables said lid to be selectively transited between a normal state and a transition state, wherein in said normal state, said lid is operable between said open state and said close state through said foot pedal, wherein when said lid is pivotally lifted up to have said included angle larger than 90 degrees, said lid is in said transition state and would not fall back toward said retainer rim, such that said receiving cavity is remained opened through said top opening of said shell and said rim opening of said retainer rim, and that said retainer rim is able to be pivotally lifted up to rest against said lid for replacing the trash bag in said shell and inverting an opening portion of the trash bag over said upper edge of said shell until said retainer rim is moved back to site on said upper edge of said shell to sandwich the opening portion of the trash bag between said upper edge of said shell and said retainer rim.

6. The trash can, as recited in claim 5, wherein said sealing slot of said retainer rim has a convex sealing surface formed therearound and said ridge of said lid has an inner concave sealing surface shaped and sized with respect to said convex sealing surface, such that said concave sealing surface of said lid is engaged with said convex sealing surface of said retainer rim when said lid is in said close state, thereby a weight of said lid applies a pivot downward force to press said concave sealing surface against said convex sealing surface during said close state of said lid.

7. A trash can for mounting a trash bag therein, comprising:

a tubular shell having an upper end defining a top opening, a lower end and a receiving cavity defined therein for receiving the trash bag therein;

a base mounted to said lower end of the shell;

a foot pedal pivotally coupled at a side of said base;

a lid assembly, comprising:

a retainer rim, having a predetermined outer size and a rim opening, pivotally coupled to said shell is such a manner that said retainer rim is able to be selectively moved to site on an upper edge of said shell while said rim opening is communicating with said receiving cavity through said top opening of said shell or pivotally lifted up from said upper edge of said shell, wherein said retainer rim has a top ring surface and a circular sealing slot indented in said top ring surface and extended around said rim opening, and a lid pivotally mounted to said shell and configured to selectively move between an open state and a close state, wherein an outer size of said lid is the same as said predetermined outer size of said retainer rim, such that in the close state, said lid fittingly sits on said retainer rim to cover said rim opening of said retainer rim and said top opening of said shell while a bottom surface of said lid seats on said top ring surface of said retainer rim and an outer surrounding side of said lid is aligned with an outer annular wall of said retainer rim, wherein said lid has a circular ridge protruded on said bottom surface of said lid and sized and shaped to engage with said sealing slot to form a sealing arrangement;

a link assembly coupling said foot pedal to said lid in such a manner that said lid is able to be lifted up pivotally from said retainer rim to said open state in response to a pressing force applied to said foot pedal, wherein in said open state, said lid is pivotally lifted up to have an included angle of 90 degrees or less from said retainer rim sited on said upper of said shell, and said lid falls back to said close state when the pressing force applied to said foot pedal is released, wherein said link assembly comprises a pivot rod, extended from said lower end of said shell to said upper end of said shell, having a lower end coupled with said foot pedal for operating said lid, wherein said transition arrangement comprises a pivot holder extended from an inner surface of said lid and a driving stud provided at an upper end of said pivot rod, wherein said pivot holder has a transition slot which defines an upper slot portion and a lower slot portion, wherein said driving stud is movably inserted into said transition slot such that said driving stud is normally retained for pivoting motion in said upper slot portion of said transition slot, and that when said driving stub is moved to said lower slot portion of said transition slot, said lid is secured in said transition state until said driving stud is disengaged from said lower slot portion of said transition slot; and a transition arrangement coupled with said lid of said lid assembly that enables said lid to be selectively transited between a normal state and a transition state, wherein in said normal state, said lid is operable between said open state and said close state through said foot pedal, wherein when said lid is pivotally lifted up to have said included angle larger than 90 degrees, said lid is in said transition state and would not fall back toward said retainer rim, such that said receiving cavity is remained opened through said top opening of said shell and said rim opening of said retainer rim, and that said retainer rim is able to be pivotally lifted up to rest against said lid for replacing the trash bag in said shell and inverting an opening portion of the trash bag over said upper edge of said shell until said retainer rim is moved back to site on said upper edge of said shell to sandwich the opening portion of the trash bag between said upper edge of said shell and said retainer rim.

8. The trash can, as recited in claim 7, wherein said sealing slot of said retainer rim has a convex sealing surface formed therearound and said ridge of said lid has an inner concave sealing surface shaped and sized with respect to said convex sealing surface, such that said concave sealing surface of said lid is engaged with said convex sealing surface of said retainer rim when said lid is in said close state, thereby a weight of said lid applies a pivot downward force to press said concave sealing surface against said convex sealing surface during said close state of said lid.

9. A trash can for mounting a trash bag therein, comprising:

a tubular shell having an upper end defining a top opening, a lower end and a receiving cavity defined therein for receiving the trash bag therein;

a base mounted to said lower end of the shell;

a foot pedal pivotally coupled at a side of said base;

a lid assembly, comprising:

a retainer rim, having a predetermined outer size and a rim opening, pivotally coupled to said shell is such a manner that said retainer rim is able to be selectively moved to site on an upper edge of said shell while said rim opening is communicating with said receiving cavity through said top opening of said shell or pivotally lifted up from said upper edge of said shell, wherein said retainer rim has a top ring surface and a circular sealing slot indented in said top ring surface and extended around said rim opening, and a lid pivotally mounted to said shell and configured to selectively move between an open state and a close state, wherein an outer size of said lid is the same as said predetermined outer size of said retainer rim, such that in the close state, said lid fittingly sits on said retainer rim to cover said rim opening of said retainer rim and said top opening of said shell while a bottom surface of said lid seats on said top ring surface of said retainer rim and an outer surrounding side of said lid is aligned with an outer annular wall of said retainer rim, wherein said lid has a circular ridge protruded on said bottom surface of said lid and sized and shaped to engage with said sealing slot to form a sealing arrangement;

a link assembly coupling said foot pedal to said lid in such a manner that said lid is able to be lifted up pivotally from said retainer rim to said open state in response to a pressing force applied to said foot pedal, wherein in said open state, said lid is pivotally lifted up to have an included angle of 90 degrees or less from said retainer rim sited on said upper of said shell, and said lid falls back to said close state when the pressing force applied to said foot pedal is released, wherein a retaining gap is formed between said link assembly and said upper edge of said shell for a respective portion of the opening portion of the trash bag to be folded and retained therein, wherein said link assembly comprises a pivot rod, extended from said lower end of said shell to said upper end of said shell, having a lower end coupled with said foot pedal for operating said lid, wherein said transition arrangement comprises a pivot holder extended from an inner surface of said lid and a driving stud provided at an upper end of said pivot rod, wherein said pivot holder has a transition slot which defines an upper slot portion and a lower slot portion, wherein said driving stud is movably inserted into said transition slot such that said driving stud is normally retained for pivoting motion in said upper slot portion of said transition slot, and that when said driving stub is moved to said lower slot portion of said transition slot, said lid is secured in said transition state until said driving stud is disengaged from said lower slot portion of said transition slot; and a transition arrangement coupled with said lid of said lid assembly that enables said lid to be selectively transited between a normal state and a transition state, wherein in said normal state, said lid is operable between said open state and said close state through said foot pedal, wherein when said lid is pivotally lifted up to have said included angle larger than 90 degrees, said lid is in said transition state and would not fall back toward said retainer rim, such that said receiving cavity is remained opened through said top opening of said shell and said rim opening of said retainer rim, and that said retainer rim is able to be pivotally lifted up to rest against said lid for replacing the trash bag in said shell and inverting an opening portion of the trash bag over said upper edge of said shell until said retainer rim is moved back to site on said upper edge of said shell to sandwich the opening portion of the trash bag between said upper edge of said shell and said retainer rim.

10. The trash can, as recited in claim 9, wherein said sealing slot of said retainer rim has a convex sealing surface formed therearound and said ridge of said lid has an inner concave sealing surface shaped and sized with respect to said convex sealing surface, such that said concave sealing surface of said lid is engaged with said convex sealing surface of said retainer rim when said lid is in said close state, thereby a weight of said lid applies a pivot downward force to press said concave sealing surface against said convex sealing surface during said close state of said lid.

11. A trash can for mounting a trash bag therein, comprising:

a tubular shell having an upper end defining a top opening, a lower end and a receiving cavity defined therein for receiving the trash bag therein;

a base mounted to said lower end of the shell;

a foot pedal pivotally coupled at a side of said base;

a lid assembly, comprising:

a retainer rim, having a predetermined outer size and a rim opening, pivotally coupled to said shell is such a manner that said retainer rim is able to be selectively moved to site on an upper edge of said shell while said rim opening is communicating with said receiving cavity through said top opening of said shell or pivotally lifted up from said upper edge of said shell, wherein said retainer rim has a top ring surface and a circular sealing slot indented in said top ring surface and extended around said rim opening, and a lid pivotally mounted to said shell and configured to selectively move between an open state and a close state, wherein an outer size of said lid is the same as said predetermined outer size of said retainer rim, such that in the close state, said lid fittingly sits on said retainer rim to cover said rim opening of said retainer rim and said top opening of said shell while a bottom surface of said lid seats on said top ring surface of said retainer rim and an outer surrounding side of said lid is aligned with an outer annular wall of said retainer rim, wherein said lid has a circular ridge protruded on said bottom surface of said lid and sized and shaped to engage with said sealing slot to form a sealing arrangement;

a link assembly coupling said foot pedal to said lid in such a manner that said lid is able to be lifted up pivotally from said retainer rim to said open state in response to a pressing force applied to said foot pedal, wherein in said open state, said lid is pivotally lifted up to have an included angle of 90 degrees or less from said retainer rim sited on said upper of said shell, and said lid falls back to said close state when the pressing force applied to said foot pedal is released, wherein said link assembly comprises a hinge assembly which comprises a hinge housing mounted to an upper position of a rear side of said shell and a pivot axle supported in said hinge housing and pivotally hinged with said retainer rim and said lid such that said retainer rim and said lid are able to be pivotally rotated about said pivot axle to selectively open or close said lid and to lift up said retainer rim, wherein said hinge housing is positioned below said upper end of said shell to define a retaining gap between said upper edge of said shell and said hinge housing for a respective portion of the opening portion of the trash bag to be folded and retained therein, wherein said link assembly comprises a pivot rod, extended from said lower end of said shell to said upper end of said shell, having a lower end coupled with said foot pedal for operating said lid, wherein said transition arrangement comprises a pivot holder extended from an inner surface of said lid and a driving stud provided at an upper end of said pivot rod, wherein said pivot holder has a transition slot which defines an upper slot portion and a lower slot portion, wherein said driving stud is movably inserted into said transition slot such that said driving stud is normally retained for pivoting motion in said upper slot portion of said transition slot, and that when said driving stub is moved to said lower slot portion of said transition slot, said lid is secured in said transition state until said driving stud is disengaged from said lower slot portion of said transition slot; and a transition arrangement coupled with said lid of said lid assembly that enables said lid to be selectively transited between a normal state and a transition state, wherein in said normal state, said lid is operable between said open state and said close state through said foot pedal, wherein when said lid is pivotally lifted up to have said included angle larger than 90 degrees, said lid is in said transition state and would not fall back toward said retainer rim, such that said receiving cavity is remained opened through said top opening of said shell and said rim opening of said retainer rim, and that said retainer rim is able to be pivotally lifted up to rest against said lid for replacing the trash bag in said shell and inverting an opening portion of the trash bag over said upper edge of said shell until said retainer rim is moved back to site on said upper edge of said shell to sandwich the opening portion of the trash bag between said upper edge of said shell and said retainer rim.

12. The trash can, as recited in claim 11, wherein said sealing slot of said retainer rim has a convex sealing surface formed therearound and said ridge of said lid has an inner concave sealing surface shaped and sized with respect to said convex sealing surface, such that said concave sealing surface of said lid is engaged with said convex sealing surface of said retainer rim when said lid is in said close state, thereby a weight of said lid applies a pivot downward force to press said concave sealing surface against said convex sealing surface during said close state of said lid.

13. The trash can, as recited in claim 12, wherein said retainer rim has an annular base adapted to be seated on said upper edge of said shell, an outer annular wall and an inner annular wall which is shorter than said outer annular wall, wherein said outer annular wall and said inner annular wall are vertically and downwardly extending form said annular base to define a retaining recess therebetween and a shoulder between said outer annular wall and said inner annular wall and said annular base, wherein in said close state, said upper edge of said shell is fittingly inserted in said retaining recess until said shoulder sited on said upper edge of said shell.

* * * * *